US010949813B2

(12) United States Patent
John et al.

(10) Patent No.: US 10,949,813 B2
(45) Date of Patent: Mar. 16, 2021

(54) METHODS AND APPARATUS TO GENERATE AN ASSET WORKSCOPE OPERATION

(71) Applicant: General Electric Company, Schenectady, NY (US)

(72) Inventors: Vijay John, West Chester, OH (US); Gregory Jon Chiaramonte, West Chester, OH (US); Mark Banks, West Chester, OH (US)

(73) Assignee: General Electric Company, Schenectady, NY (US)

( * ) Notice: Subject to any disclaimer, the term of this patent is extended or adjusted under 35 U.S.C. 154(b) by 604 days.

(21) Appl. No.: 15/809,737

(22) Filed: Nov. 10, 2017

(65) Prior Publication Data
US 2019/0147411 A1 May 16, 2019

(51) Int. Cl.
G06Q 10/00 (2012.01)
F01D 21/00 (2006.01)
G06Q 10/06 (2012.01)

(52) U.S. Cl.
CPC .......... G06Q 10/20 (2013.01); F01D 21/003 (2013.01); G06Q 10/06315 (2013.01); F05D 2220/32 (2013.01)

(58) Field of Classification Search
CPC .. G06Q 10/20; G06Q 10/06315; G06F 30/00; G06F 30/15; G06F 30/17; F01D 21/003; F05D 2220/32
USPC ........................................................ 703/7, 6
See application file for complete search history.

(56) References Cited

U.S. PATENT DOCUMENTS

| 6,067,486 | A  | 5/2000  | Aragones et al. |
| 6,732,040 | B2 | 5/2004  | Sangeeta et al. |
| 6,832,205 | B1 | 12/2004 | Aragones et al. |
| 6,871,160 | B2 | 3/2005  | Jaw             |
| 8,868,287 | B2 | 10/2014 | Delaye et al.   |
| 9,477,224 | B2 | 10/2016 | Khan et al.     |

(Continued)

FOREIGN PATENT DOCUMENTS

EP    2587424 A1    5/2013

OTHER PUBLICATIONS

European Search Report from EP Appl. No. 18204893, dated May 3, 2019.

(Continued)

*Primary Examiner* — Cedric Johnson
(74) *Attorney, Agent, or Firm* — Wood IP LLC

(57) ABSTRACT

Methods, apparatus, systems, and articles of manufacture to generate workscope tasks. An example apparatus includes a workscope task generator and a workscope task processor. The example workscope task generator is to process an asset health quantifier and a next mission criterion for a target asset according to a workscope transfer function to generate a set of workscope tasks for maintenance of the asset at a desired health state to satisfy the next mission criterion, the workscope tasks involving a location, a resource, and a time for maintenance of the engine. When the generated set of workscope tasks does not satisfy a lifecycle expectation for the asset, the generated set of workscope tasks is modified by the workscope task processor to generate a set of targeted, forecast workscope tasks from the modified set of workscope tasks to trigger maintenance of the engine.

18 Claims, 15 Drawing Sheets

(56) References Cited

U.S. PATENT DOCUMENTS

| | | |
|---|---|---|
| 2006/0010152 A1 | 1/2006 | Catalano et al. |
| 2008/0162235 A1 | 7/2008 | Tomastik |
| 2008/0172268 A1 | 7/2008 | Wingenter |
| 2009/0048730 A1 | 2/2009 | Akkaram et al. |
| 2010/0262442 A1 | 10/2010 | Wingenter |
| 2011/0093157 A1* | 4/2011 | Prabhakaran .......... G07C 5/085 701/29.5 |
| 2012/0166249 A1 | 6/2012 | Jackson |
| 2013/0110587 A1 | 5/2013 | Nowicki et al. |
| 2013/0179388 A1 | 7/2013 | Agarwal et al. |
| 2014/0278713 A1 | 9/2014 | Zivelin |
| 2015/0067018 A1* | 3/2015 | Connolly ............. G06Q 30/016 709/202 |
| 2015/0185716 A1* | 7/2015 | Wichmann ................ G05F 1/66 700/287 |

OTHER PUBLICATIONS

Donaldson et al., "Economic Impact of Derated Climb on Large Commercial Engines", 2007 Performance and Flight Operations Engineering Conference, 14 pages.

James et al., "Derated Climb Performance in Large Civil Aircraft", 2005 Performance and Flight Operations Engineering Conference, 14 pages.

\* cited by examiner

METHODS AND APPARATUS TO GENERATE AN ASSET WORKSCOPE OPERATION

FIELD OF THE DISCLOSURE

This disclosure relates generally to engine workscope determination and, more particularly, to methods and apparatus to generate an asset workscope operation.

BACKGROUND

In recent years, turbine engines have been increasingly utilized in a variety of applications and fields. Turbine engines are intricate machines with extensive availability, reliability, and serviceability requirements. Traditionally, maintaining turbine engines incur steep costs. Costs generally include having exceptionally skilled and trained maintenance personnel service the turbine engines. In some instances, costs are driven by replacing expensive components or by repairing complex sub-assemblies.

The pursuit of increasing turbine engine availability while reducing premature maintenance costs requires enhanced insight. Such insight is needed to determine when to perform typical maintenance tasks at generally appropriate service intervals. Traditionally, availability, reliability, and serviceability increase as enhanced insight is deployed.

The market for long-term contractual agreements has grown at high rates over recent years for many service organizations. As the service organizations establish long-term contractual agreements with their customers, it becomes important to understand the expected scope of work (also referred to as "workscope") including product, service, and/or other project result. In addition, the service organizations need to have an understanding of the planning of repairs (e.g., shop workload and/or workscope planning) and how the maintenance of components will affect management of their service contracts including time, cost, risk, etc.

BRIEF DESCRIPTION OF THE DRAWINGS

The figures are not to scale. Wherever possible, the same reference numbers will be used throughout the drawing(s) and accompanying written description to refer to the same or like parts.

BRIEF SUMMARY

Figure 1:
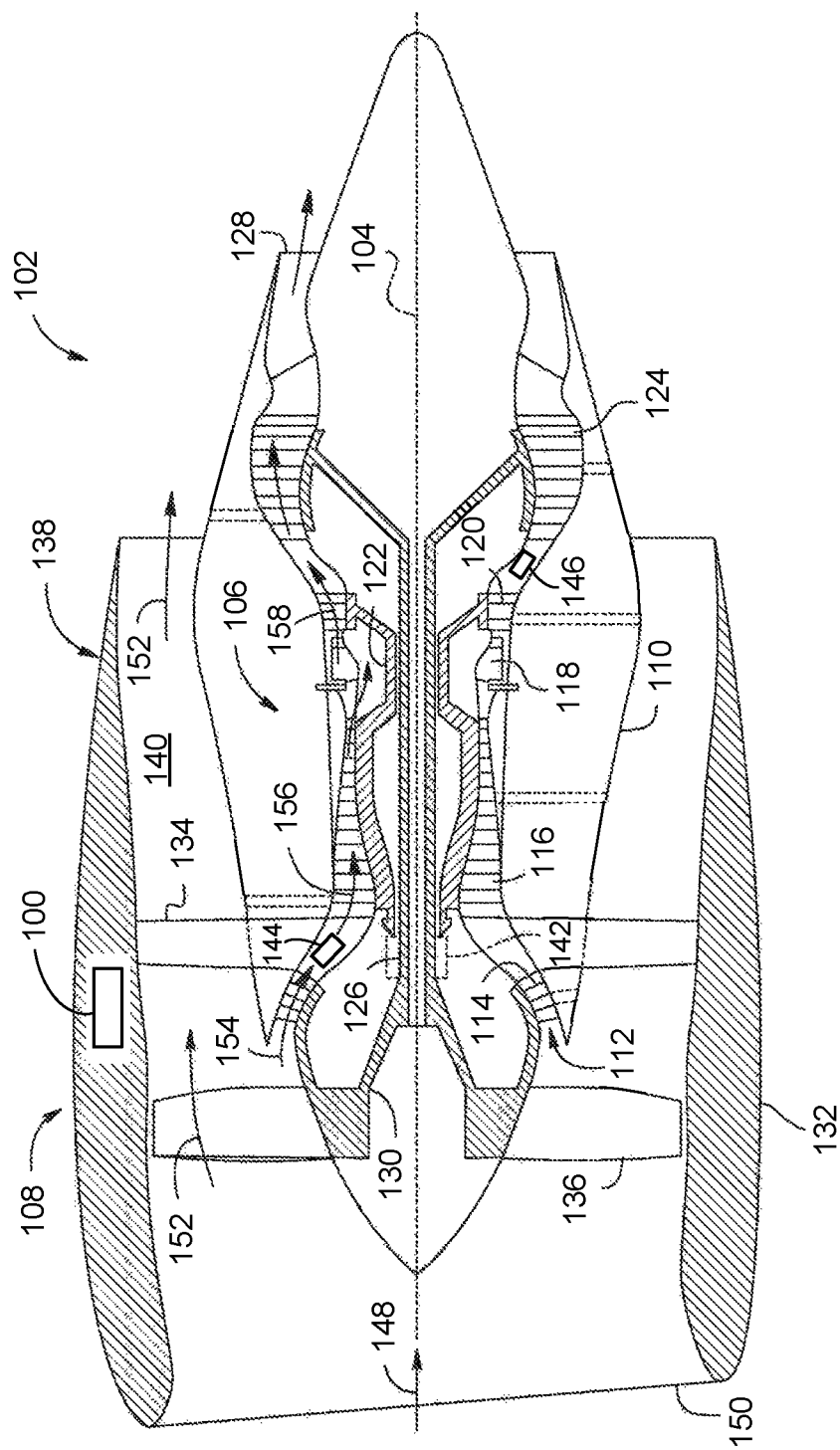
FIG. 1 illustrates an example gas turbine engine that can be utilized within an aircraft in which the examples disclosed herein can be implemented.

Methods, apparatus, systems, and articles of manufacture to generate tasks for maintenance of a target asset are disclosed.

An example engine maintenance apparatus includes a workscope task generator and a workscope task processor. The example workscope task generator is to process, for an engine, an asset health quantifier for the engine and a next mission criterion for the engine according to a workscope transfer function to generate a set of workscope tasks for maintenance of the engine at a desired health state to satisfy the next mission criterion, the workscope tasks involving a location, a resource, and a time for maintenance of the engine. The example workscope task processor is to process the generated set of workscope tasks in comparison to a lifecycle expectation for the engine, wherein, when the generated set of workscope tasks does not satisfy the lifecycle expectation for the engine, the set of workscope tasks is modified by the workscope task processor, the workscope task processor to generate a set of targeted, forecast workscope tasks from the modified set of workscope tasks to trigger maintenance of the engine.

An example non-transitory computer readable storage medium includes instructions which when executed, cause a machine to implement at least: a workscope task generator and a workscope task processor. The example workscope task generator is to process, for an engine, an asset health quantifier for the engine and a next mission criterion for the engine according to a workscope transfer function to generate a set of workscope tasks for maintenance of the engine at a desired health state to satisfy the next mission criterion, the workscope tasks involving a location, a resource, and a time for maintenance of the engine. The example workscope task processor is to process the generated set of workscope tasks in comparison to a lifecycle expectation for the engine, wherein, when the generated set of workscope tasks does not satisfy the lifecycle expectation for the engine, the set of workscope tasks is modified by the workscope task processor, the workscope task processor to generate a set of targeted, forecast workscope tasks from the modified set of workscope tasks to trigger maintenance of the engine.

An example computer-implemented method includes processing, using a configured processor, health information, non-health information, and next mission requirements for a target asset to generate one or performance metrics. The example method includes generating, using the configured processor and a workscope transfer function with the one or more performance metrics, one or more tasks for maintenance of the target asset. The example method includes, when the generated tasks do not satisfy the lifecycle expectation for the target asset, modifying, using the configured processor, the one or more tasks based on the lifecycle expectation. The example method includes generating and outputting, using the configured processor based on the one or more tasks, a set of targeted, forecast workscope tasks to trigger maintenance of the target asset.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. A turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

A turbine engine (e.g., an aircraft turbine engine) typically includes components (e.g., asset components, etc.) or modules (e.g., asset modules or assemblies including one or more components, etc.) for operation such as a fan (e.g., a fan section), a booster compressor, a high-pressure compressor, a high-pressure turbine, and a low-pressure turbine. The components can degrade over time due to demanding operating conditions such as extreme temperature and vibration. In some instances, debris or other objects enter the turbine engine via the fan and cause damage to one or more components. Routine maintenance intervals and service checks can be implemented to inspect for degradation and/or damage. However, in some instances, taking the turbine engine offline or off wing to perform maintenance includes taking an entire system, such as an aircraft, offline. In addition to prematurely replacing expensive components, aircraft non-operation can incur additional costs such as lost revenue, labor costs, etc. Monitoring components for degradation can provide actionable information for maintenance personnel to replace a component of the turbine engine when necessary, to optimally schedule maintenance tasks of the turbine engine based on contractual and/or maintenance resources, etc. While example assets described herein have been illustrated in terms of engines, such as a turbine engine, diesel engine, etc., the systems and methods disclosed and described herein can also apply to assets such as wind turbines, additive printing machines, computed tomography scanners, etc.

Examples disclosed herein include an example asset workscope generation system (AWGS) to combine field data, statistical analytic tools, engineering physics-based models, prediction simulators integrated with forecasted mission requirements, etc., to develop a recommended modular workscope and a timing to perform the recommended modular workscope for an asset such as a turbine engine to satisfy customer and field personnel expectations. As used herein, the term "workscope" (also referred to as a "scope of work") refers to a set of tasks (e.g., one or more maintenance tasks, service tasks, etc.) executed by maintenance personnel to improve an operating condition of an asset, where the operating condition is determined based on requirements such as contractual requirements, environmental requirements, regulatory requirements, utilization requirements, etc., and/or a combination thereof. The workscope can include a strategy or a plan for performing one or more maintenance activities upon components of a system.

A workscope may include, without limitation, a list of components within the system, one or more dates and/or times that a component should be repaired or have maintenance performed on it, an expected cost of completing each step or maintenance activity of the workscope, and/or one or more probabilities of each component failing or requiring a maintenance activity to be performed during a time period of the workscope. Alternatively or additionally, a workscope may include an amount of use and/or a number cycles (e.g., in the case of a component of a rotating machine) that the component has experienced (hereinafter referred to as a "cycle time" of the component), a cost to repair the component, and/or a cost to replace the component.

In certain examples, a workscope is determined based on multiple inputs including cumulative damage models of parts, modules, and systems, statistical models (e.g., parametric (e.g., Weibull probability distribution, etc.) and/or non-parametric models), financial models, contract term, conditions, customer expectations, etc. One or more models can be implemented using a digital twin (e.g., via an artificial neural network and/or other machine learning implementation of an aspect and/or characteristic of the physical asset, etc.), for example. Certain examples allow the workscope model inputs to evaluate the financial impact of a series of possible workscopes over the life of a service contract. A user can then create an optimized and/or otherwise improved workscope selection with associated predicted outcomes.

In some examples, the AWGS obtains asset monitoring information from one or more assets, a network, a server, etc. As used herein, the term asset monitoring information refers to information corresponding to one or more assets such as asset sensor information, asset environmental information, asset utilization information, asset configuration information, asset history information, asset class history information, asset workscope quantifiers, etc.

In some examples, the AWGS identifies target assets for removal from service (e.g., removal from an aircraft, removal from a facility, removal from use, etc.) based on calculating an asset health quantifier. As used herein, the term "asset health quantifier" refers to a numerical representation corresponding to a health status, an operational status, etc., of an asset, an asset component, etc. For example, the asset health quantifier can be represented by a percentage of useful life remaining, a number of flight cycles (e.g., a number of flight cycles to be executed before service is performed, etc.), a quantity of time-on-wing (TOW) hours (e.g., a number of time-on-wing hours before service is performed, etc.), etc. For example, an asset health quantifier of 75% for a turbine engine booster compressor can correspond to the booster compressor having 75% of useful life remaining before the booster compressor may become nonresponsive or requires a maintenance action. In another example, an asset health quantifier of 500 cycles for a turbine engine fan section can correspond to the turbine engine fan section executing 500 cycles before the fan section can be serviced to satisfy a contractual requirement.

In some examples, the AWGS can execute one or more engineering physics-based models, historical information-based models, statistical models, etc., and/or a combination thereof to generate an actual asset health quantifier for an asset, an asset component, an asset module, etc. In some examples, the AWGS can generate a projected asset health quantifier based on forecasted mission requirements of the asset (e.g., forecasted contractual requirements, forecasted environmental information, etc.).

In some examples, the AWGS can identify one or more target assets for removal based on comparing one or more asset health quantifiers (e.g., an actual asset health quantifier, a projected asset health quantifier, etc.) to a threshold, determine whether the one or more asset health quantifiers satisfy the threshold, and identify the one or more target assets for removal based on the comparison.

In some examples, the AWGS generates a workscope task for the target asset. For example, the AWGS can identify a set of tasks (e.g., maintenance tasks, service tasks, etc.) to perform maintenance on a fan section (e.g., one or more fan blades, etc.) of a turbine engine. For example, the AWGS can identify maintenance costs corresponding to each task in the set of tasks. For example, the AWGS can calculate a cost based on a quantity of maintenance personnel and corresponding man-hours to perform a maintenance task, a quantity of components (e.g., a quantity of replacement parts, spare parts, shop-supplied parts, etc., and/or a combination thereof) to perform the maintenance task, a monetary cost for each of the components, etc.

In some examples, the AWGS optimizes and/or otherwise improves a workscope based on the generated workscope tasks for the target asset. For example, the AWGS can generate a plurality of workscopes in which each workscope includes a combination of one or more of the generated workscope tasks. The example AWGS can calculate an estimate asset health quantifier for the target asset based on estimating what the asset health quantifier for the target asset can be in response to performing a specified workscope on the target asset. The example AWGS can calculate an estimate asset health quantifier for each one of the generated workscopes. The example AWGS can identify a workscope for the target asset based on one or more factors such as comparing the calculated estimate asset health quantifiers to contractual requirements, customer requirements, operational constraints, etc., and/or a combination thereof.

In some examples, the AWGS calculates a workscope quantifier based on comparing a first asset health quantifier for a target asset to a second asset health quantifier for the target asset. For example, the first asset health quantifier can be an asset health quantifier (e.g., an actual asset health quantifier, a projected asset health quantifier, etc.) of the target asset prior to completing a workscope on the target asset. The second asset health quantifier can be an asset health quantifier (e.g., an actual asset health quantifier, a projected asset health quantifier, etc.) of the target asset after completing the workscope on the target asset. For example, the AWGS can calculate a workscope quantifier by calculating a difference between the first and the second asset health quantifiers.

In some examples, the AWGS can compare the workscope quantifier to a workscope quantifier threshold and determine whether the workscope quantifier threshold has been satisfied based on the comparison. In some examples, the AWGS can modify one or more components of the AWGS in response to the workscope quantifier threshold being satisfied. For example, the AWGS can update one or more models, one or more parameters corresponding to a maintenance task, improve an optimization parameter for evaluating generated workscopes, etc., and/or a combination thereof in response to the workscope quantifier threshold being satisfied. While example assets described herein have been illustrated in terms of engines, such as a turbine engine, diesel engine, etc., the systems and methods disclosed and described herein can also apply to assets such as wind turbines, additive printing machines, locomotive engines, health imaging equipment such as computed tomography scanners, etc., or any other type of mechanical, electrical, or electro-mechanical device. Additionally or alternatively, the systems and methods disclosed and described herein can also apply to any asset that has modular elements that require maintenance planning and scheduling a removal within requirement constraints such as contractual constraints corresponding to a management of spare assets.

Examples disclosed herein include an asset health calculator apparatus to identify a target asset for removal from service based on calculating an asset health quantifier of the target asset. In some examples, the asset health calculator apparatus obtains asset monitoring information corresponding to the target asset. For example, the asset health calculator apparatus can obtain asset sensor information, asset environmental information, asset utilization information, etc., and/or a combination thereof corresponding to the target asset.

In some examples, the asset health calculator apparatus executes one or more models such as an engineering physics-based model, a statistical model, etc., to generate an asset health quantifier for an asset, an asset component, an asset module, etc. In some examples, the asset health calculator apparatus generates a projected asset health quantifier based on forecasted mission requirements of the asset such as forecasted environmental information, forecasted utilization information, etc., to determine whether a degradation of the asset component will cause an unexpected shop visit (e.g., a shop visit prior to a next scheduled or anticipated shop visit, etc.)

In some examples, the asset health calculator apparatus calculates a projected asset health quantifier of an asset component by predicting an estimate of the actual asset health quantifier of the asset component based on an anticipated deterioration of the asset component over time. For example, the asset health calculator apparatus can predict the deterioration by using the actual asset health quantifier as an initial actual asset health quantifier of the asset component, and extrapolating the initial actual asset health quantifier to the projected asset health quantifier by executing one or more models using forecasted mission requirements including a number of flight cycles, a quantity of time-on-wing hours, etc.

In some examples, the asset health calculator apparatus aggregates and ranks the actual asset health quantifiers, the projected asset health quantifiers, etc. For example, the asset health calculator apparatus can rank assets or components of the assets based on the generated asset health quantifiers. In some examples, the asset health calculator apparatus compares an asset health quantifier to a threshold (e.g., an asset health quantifier threshold, a maintenance quantifier threshold, etc.) and determines whether the asset health quantifier satisfies the threshold based on the comparison.

In some examples, the asset health calculator apparatus identifies a first set of candidate assets including one or more assets as candidate(s) for removal based on comparing an asset health quantifier of an asset to a threshold and determining whether the asset health quantifier satisfies the threshold based on the comparison. For example, the asset health calculator apparatus can identify a turbine engine for removal from service to perform a maintenance activity on the turbine engine based on an asset health quantifier for the turbine engine satisfying a threshold.

In some examples, the asset health calculator apparatus identifies a second set of candidate assets including one or more assets as candidate(s) for removal based on non-asset monitoring information. For example, the asset health calculator apparatus can identify a turbine engine for removal based on a time interval between maintenance tasks specified in a contract, customer technical forecast information, customer spare part information, etc., for the turbine engine. As used herein, the term "contract" refers to an agreement between a turbine engine operator (e.g., an airline, a manufacturing plant, a power plant, etc.) and a turbine engine maintenance provider in which the turbine engine maintenance provider performs maintenance, service, etc., on an asset owned by the turbine engine operator.

In some examples, the asset health calculator apparatus compares candidate assets in the first set to the second set. In some examples, the asset health calculator apparatus identifies target assets for removal based on the comparison. In some examples, the asset health calculator apparatus generates a removal schedule for the identified target assets. For example, the asset health calculator apparatus can determine that the identified target assets correspond to one contract or more than one contract. For example, in response to determining that the target assets correspond to one contract, the asset health calculator apparatus can generate an optimal removal schedule of the target assets based on performing an optimization process such as an iterated local search.

In another example, in response to determining that the target assets correspond to more than one contract, the asset health calculator apparatus can generate a removal schedule for the target assets using methods such as integer programming, myopic optimization (e.g., a rolling optimization method, etc.), single level optimization, top-down optimization, bottom-up optimization, etc., and/or a combination thereof. For example, the asset health calculator apparatus can generate a removal schedule using single level optimization by optimizing and/or otherwise improving each asset corresponding to each contract simultaneously (or substantially simultaneously given data processing, transmission, and storage latency).

In another example, the asset health calculator apparatus can generate a removal schedule using top-down optimization by generating a high-level, top-level, etc., target removal schedule for each contract, generating a candidate removal schedule for each contract, and generating an optimized and/or otherwise improved removal schedule for the contracts based on the comparison of the target removal schedules to the candidate removal schedules. In another example, the asset health calculator apparatus can generate a removal schedule using bottom-up optimization by generating candidate removal schedules for each contract, combining the candidate removal schedules, and re-adjusting the candidate removal schedules to help ensure global feasibility with respect to one or more factors such as customer constraints, maintenance facility constraints, spare part availability constraints, etc., and/or a combination thereof.

In certain examples, the AWGS includes a Workscope Strategy Analyzer (WSA) that evaluates, for each possible workscope strategy, a financial, availability (e.g., uptime vs. downtime), resource, and/or other impact of a series of possible workscopes over the life of a service contract. The WSA facilitates creation of an optimized and/or otherwise improved workscope selection with associated predicted outcomes. For example, a workscope selection can be generated by obtaining specific contract information and mapping failure mode distributions to workscope models to construct a workscope model with associated price, cost and billing structure. For a given shop visit, probabilities associated with failure modes for workscope options can be determined using a dynamic programming approach which is propagated to the end of the contract.

In certain examples, for each analytical tool available that can trigger work on a part or module, the analytical tool can be mapped to a minimum workscope and multiple analytical tools can be combined to define a minimum workscope. Then, uncertainty cam be propagated for each analytic and combine at the part/module and engine level. The combined uncertainty feeds an algorithm to perform analytical trade-offs related to a cost of overhauling and benefits to financial and time-on-wing terms.

In certain examples, a prediction tool generates or identifies one or more workscopes from which a workscope that meets a predefined criterion or criteria can be selected. The prediction tool receives inputs from other tools, from the user, and/or from another system or device. In an example, the prediction tool receives engine information from an analyzer tool and receives workscope financial information from a financial model tool. More specifically, in an example, the engine information received from the analyzer tool includes, without limitation, an amount of time that engine has been in use since a most recent maintenance event, an amount of time that one or more engine components have been in use since the most recent maintenance or repair event, one or more components that have failed, and/or any other data that enables the prediction tool. The workscope financial information received from the financial model tool includes a financial impact of each maintenance activity defined within each workscope, such as a financial impact of maintenance or repair of each component at one or more future dates. In an example, the financial impact includes a cost of performing maintenance activities on the components. However, the financial impact additionally or alternatively includes a price, a profit, and/or any other financial effect associated with performing maintenance activities on the components. Alternatively or additionally, the prediction tool may receive other inputs, such as an engine condition, diagnostics data, workscope requirements, and/or any other input.

As used herein, the term "maintenance event" refers to an event in which the system (e.g., the engine) or components thereof are taken to a maintenance or repair facility, or "shop," to perform one or more maintenance activities on the system or components. Maintenance events are also known as "shop visits." These maintenance events may include failure driven events, where the system or component is taken to the facility as a result of a failure, and may also include non-failure driven visits, such as visits to the facility for preventative maintenance. As used herein, the term "maintenance activity" refers to performing maintenance on a system or component, and/or repairing the system or component.

In an example, the prediction tool generates an output indicative of one or more workscopes that are available to be performed on the engine (hereinafter referred to as "available workscopes"). In one embodiment, each workscope defines a different set of maintenance activities to be performed on the components than each other workscope. In an example, the prediction tool identifies or generates a "base" workscope, a "full" workscope, and/or one or more alternative workscopes that are available to be performed on the engine. In an example, the base workscope is a minimal set of maintenance activities to be performed on the engine and/or engine components. Alternatively, the base workscope may be a predetermined or "default" set of repair and/or maintenance activities to be performed on the engine and/or engine components. For example, the base workscope may include only repairing components that have failed and/or that are identified as "life-limited" components. As used herein, the term "life-limited" refers to a component that is required to be replaced and/or repaired within a predetermined time period. The alternative workscopes include additional, and/or different, repair and/or maintenance activities that may be performed on the engine and/or engine components as compared to the activities identified in the base workscope. The full workscope is a full set of maintenance activities to be performed on each component of the system. For example, the full workscope may include performing a maintenance activity on each component of the system when the system and/or components are taken to the maintenance facility, even if the components are not identified as requiring maintenance or repair. The available workscopes (e.g., the base workscope, the full workscope, and/or the alternative workscopes) are transmitted to the financial model tool and/or to analyzer tool.

In an example, the financial model tool receives inputs from the prediction tool and analyzer tool. The financial model tool generates outputs indicative of financial information (e.g., the financial impact) associated with each workscope and transmits the outputs to the prediction tool and the analyzer tool. The financial information includes, for example, a cost of each maintenance activity of each workscope and/or any other financial impact of each maintenance activity. In an example, the financial model tool receives a list of available workscopes from the prediction tool and/or from the analyzer tool. In an example, the financial model tool also receives data regarding a service contract or another instrument identifying repair and/or maintenance obligations for the engine and/or engine components, and a time period in which the service contract is in force. In an example, the financial model tool calculates the cost and/or price (or other financial impact) of each maintenance activity of each workscope by calculating the repair and/or maintenance costs and/or prices, for example, associated with each activity identified in each workscope. In an example, the financial model tool generates quotations for approval for one or more workscopes for a given set of requirements and generates a cost and price for the workscopes based on historical records and/or business plans. The financial model tool transmits the determined cost and/or price, or other financial impact, of each available workscope (e.g., the cost of the maintenance activities of the base workscope, the full workscope, and/or of each alternative workscope) to the prediction tool and/or to the analyzer tool.

In an example, the analyzer too receives inputs from the prediction tool and the financial model tool. Moreover, the analyzer tool generates outputs and transmits the outputs to the prediction tool and the financial model tool. The analyzer tool receives the list of available workscopes and the financial information from the prediction tool and/or from the financial model tool. The analyzer tool selects and/or presents to the user a recommended workscope based on the inputs received. For example, the analyzer tool calculates a probability distribution of expected maintenance activities within each workscope and selects a workscope with the lowest expected cost and/or price. Alternatively, the analyzer tool selects a workscope that satisfies any other criterion or criteria identified by the user or by a system or device. For example, the analyzer tool determines an expected effect of each workscope and selects the workscope that has the expected effect that best satisfies the criterion or criteria. The expected effect may include, for example, one or more of an expected cost, an expected price, an expected profit, an expected cash flow, an expected maintenance facility loading, an expected spare engine capacity or availability, and/or an expected "time on wing" interval of the workscope. Accordingly, in the example, the analyzer tool may select a workscope that has a lowest expected cost for the maintenance activities expected to be performed during a predefined time interval. However, it should be recognized that analyzer tool may select a workscope in which the expected effect of the workscope satisfies any other criterion or criteria during the time interval.

In an example, the analyzer tool quantifies the benefits and costs of the workscopes received by, for example, calculating the probability (e.g., a Weibull distribution, etc.) of each workscope's "time on wing" (TOW) (e.g., each workscope's effect on the engine's time in operation) and financial output (e.g., an effect of each workscope on an amount of revenue expected to be generated by the engine as a result of each workscope). In an example, for each available workscope, the analyzer tool presents to the user a series of probability distributions representing expected financial and operational future outcomes of performing the workscopes on the engine and/or engine components throughout a plurality of future repair and/or maintenance events.

In the example, the analyzer tool receives inputs (hereinafter referred to as "external inputs") from an external source such as from a user or from a remote device or system. The external inputs include one or more of an engine condition, a condition of one or more engine components, an amount of time or engine cycles in which the engine and/or engine components have been in operation, an indication of a failing or failed engine component, a set or list of business constraints and/or constraints due to one or more service or other contracts, an amount of time that one or more service or other contracts are in force, a notification or an indication that one or more components are or include life-limited parts, and/or failure distributions computed from historical field data. Alternatively, any of the external inputs may be received by other tools and may be transmitted to the analyzer tool.

In an example, the analyzer tool uses a state-based solution or model to provide a logistical framework for selecting among workscope alternatives (e.g., to facilitate selecting an optimal or recommended workscope from the list of available workscopes). In an example, the analyzer tool determines which workscope should be performed at each failure driven shop visit in order to minimize the total expected cost (e.g., of maintenance activities within a service contract) over a specified time interval (e.g., during the remaining time that the service contract is in effect). The analyzer tool determines the lowest expected maintenance cost (or determines an expected effect that satisfies any other criterion or criteria) for the system associated with the service contract using a dynamic programming solution, for example.

Asset maintenance management involves a detailed knowledge of the durability of the parts, modules and interactions due to assembly of the asset plus. As more analytic models are available that track the durability of components and modules, along with complexities in how different maintenance contracts are engineered, it becomes very complex to evaluate the financial implications of different workscoping decisions. Certain examples combine available technical, analytical and financial information to compute the financial implications for different workscoping scenarios.

FIG. 1 is a schematic illustration of an example turbine engine controller 100 monitoring an example gas turbine engine 102. In the illustrated example, the turbine engine controller 100 is a full-authority digital engine control (FADEC) unit. For example, the turbine engine controller 100 can include a closed loop control module to generate a control input (e.g., a thrust command, a de-rate parameter, etc.) to the engine 102 based on an engine input (e.g., a pilot command, an aircraft control system command, etc.). Alternatively, the turbine engine controller 100 may be any other type of data acquisition and/or control computing device. FIG. 1 illustrates a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. In general, the engine 102 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 102 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary nozzle vanes and an annular array of rotating turbine blades positioned immediately downstream of the nozzle vanes.

Additionally, as shown in FIG. 1, the fan section 108 of the engine 102 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

In the illustrated example of FIG. 1, the engine 102 includes sensors 144, 146 communicatively coupled to the turbine engine controller 100. Alternatively, the sensors 144, 146 can be communicatively coupled to a control system of an aircraft coupled to the engine 102, in which the control system is communicatively coupled to the example turbine engine controller 100. In the illustrated example, the sensors 144, 146 are gas-path temperature sensors (e.g., exhaust gas-path temperature sensors, etc.). For example, the sensors 144, 146 can be monitoring a compressor inlet temperature and a temperature of gas exiting the high-pressure turbine 120. Alternatively, the sensors 144, 146 can be chip detector sensors (e.g., magnetic chip detector sensors, etc.), dust sensors, flow sensors, gas-path pressure sensors, rotor speed sensors, vibration sensors, position sensors (e.g., actuator position sensors, sensors detailing variable geometry, etc.), etc. Although the sensors 144, 146 are depicted in FIG. 1 as being at specific locations, the sensors 144, 146 can be located elsewhere on the engine 102. Additionally or alternatively, there can be more than two sensors 144, 146 located on the engine 102. A typical implementation has six gas-path temperature sensors 144, 146. Additionally or alternatively, there can be more than one example turbine engine controller 100 coupled to the engine 102. Although the example turbine engine controller 100 is depicted in FIG. 1 as being proximate the fan section 108, the turbine engine controller 100 can be located elsewhere on the engine 102 or elsewhere on the aircraft coupled to the engine 102.

During operation of the engine 102, an initial air flow (indicated by arrow 148) can enter the engine 102 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

Figure 2:
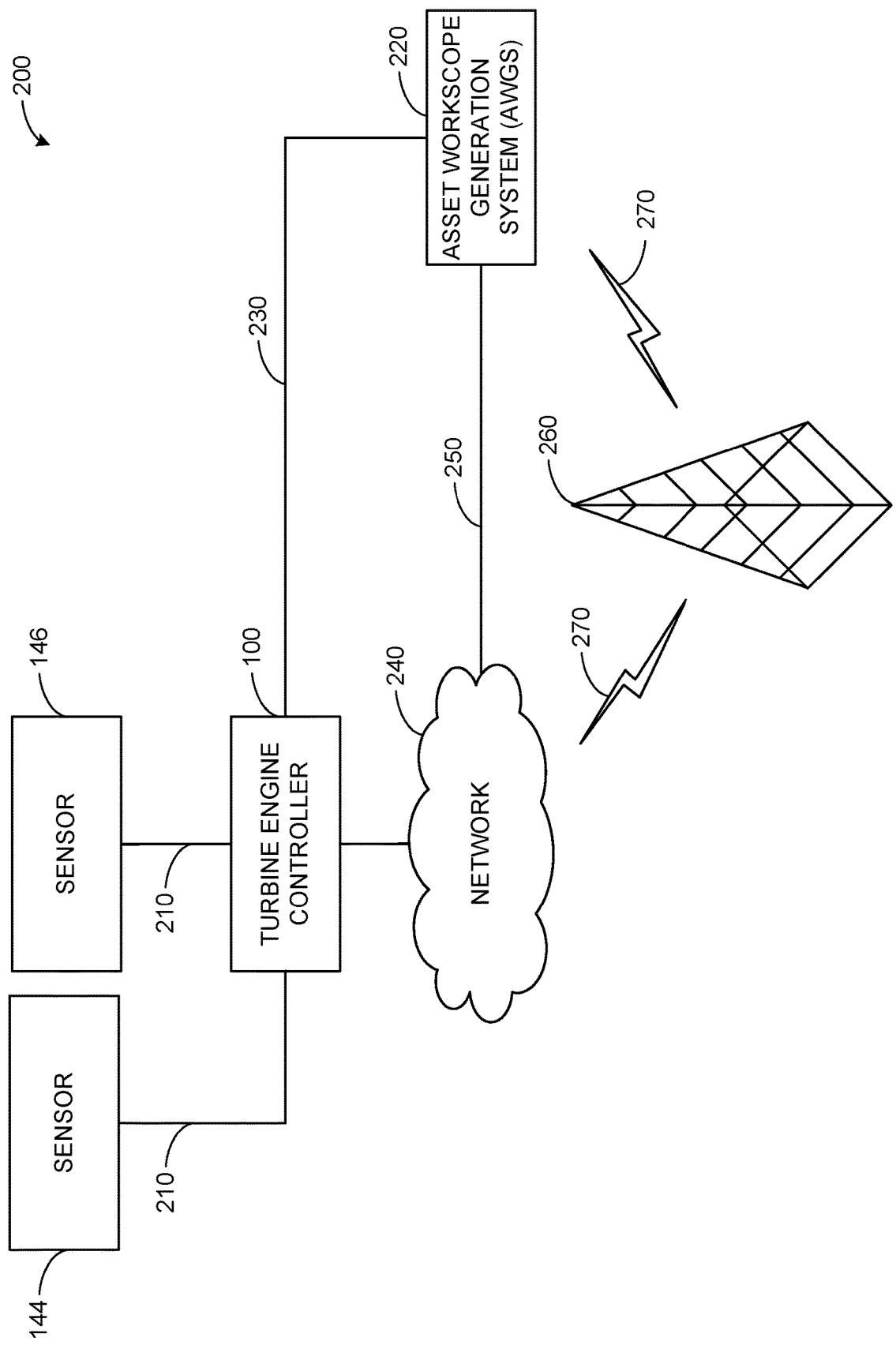
FIG. 2 is a block diagram of an example environment in which an example asset workscope generation system monitors the example gas turbine engine of FIG. 1.

FIG. 2 is a schematic illustration of an example asset monitoring system 200 for the gas turbine engine 102 of FIG. 1. In the illustrated example of FIG. 2, the sensors 144, 146 of FIG. 1 are communicatively coupled to the turbine engine controller 100 via sensor connections 210. The example turbine engine controller 100 obtains asset sensor information (e.g., a pressure, a temperature, a speed of a rotor, etc.) from the sensors 144, 146 to monitor an operation of the gas turbine engine 102. The sensor connections 210 can include direct wired or direct wireless connections. For example, a direct wired connection can involve a direct connection using wires in a harness connecting the sensors to the turbine engine controller 100, or a bus such as the Engine Area Distributed Interconnect Network (EADIN) bus. In another example, the direct wireless connections can implement a Bluetooth® connection, a Wi-Fi Direct® connection, or any other wireless communication protocol. Further shown in FIG. 2 are an example asset workscope generation system (AWGS) 220, an example AWGS direct connection 230, an example network 240, an example AWGS network connection 250, an example wireless communication system 260, and an example wireless communication links 270. As described further below, the example AWGS 220 can include a workscope strategy analyzer (WSA) to evaluate potential workscope strategies to determine an improved or "optimized" workscope for an asset.

In the illustrated example of FIG. 2, the example turbine engine controller 100 is shown to be communicatively coupled to the AWGS 220 via the AWGS direct connection 230. For example, the AWGS 220 can obtain asset operation information such as flight data (e.g., altitudes, turbine engine speeds, engine exhaust temperatures, etc.), asset sensor information, etc., from the turbine engine controller 100 via the AWGS direct connection 230. The example AWGS direct connection 230 can be a direct wired or a direct wireless connection. For example, the AWGS 220 can download asset information (e.g., asset operation information, asset sensor information, etc.) of the engine 102 via a manual download of the data from the turbine engine controller 100 to a computing device such as a laptop, a server, etc., followed by a subsequent upload to the AWGS 220. Alternatively, the example AWGS 220 can be directly connected to the turbine engine controller 100 to obtain asset information.

The AWGS 220 of the illustrated example is a server that collects and processes asset information of the engine 102. Alternatively or in addition, the example AWGS 220 can be a laptop, a desktop computer, a tablet, or any type of computing device or a network including any number of computing devices. The example AWGS 220 analyzes the asset information of the engine 102 to determine an asset workscope. For example, the AWGS 220 can determine that the high-pressure compressor 116 of FIG. 1 requires a water-wash based on a comparison of an asset health quantifier of the high-pressure compressor 116 to an asset health quantifier threshold corresponding to the high-pressure compressor 116, an elapsing of a time interval specified in a contract, etc.

Additionally or alternatively, the example AWGS 220 can obtain asset information from the example turbine engine controller 100 via the network 240. For example, the AWGS 220 can obtain asset information of the engine 102 from the turbine engine controller 100 by connecting to the network 240 via the AWGS network connection 250. The example AWGS network connection 250 can be a direct wired or a direct wireless connection. For example, the turbine engine controller 100 can transmit asset information to a control system of an aircraft coupled to the engine 102. The aircraft control system can subsequently transmit the asset information to the example AWGS 220 via the network 240 (e.g., via the AWGS network connection 250, the wireless communication links 270, etc.).

The example network 240 of the illustrated example of FIG. 2 is the Internet. However, the example network 240 can be implemented using any suitable wired and/or wireless network(s) including, for example, one or more data buses, one or more Local Area Networks (LANs), one or more wireless LANs, one or more cellular networks, one or more private networks, one or more public networks, etc. The example network 240 enables the example turbine engine controller 100 to be in communication with the example AWGS 220. As used herein, the phrase "in communication," including variances therefore, encompasses direct communication and/or indirect communication through one or more intermediary components and does not require direct physical (e.g., wired) communication and/or constant communication, but rather includes selective communication at periodic and/or aperiodic intervals, as well as one-time events.

In some examples, the turbine engine controller 100 is unable to transmit asset information to the AWGS 220 via the AWGS direct connection 230, the AWGS network connection 250, etc. For example, a routing device upstream of the AWGS 220 can stop providing functional routing capabilities to the AWGS 220. In the illustrated example, the turbine engine health monitoring system 200 includes additional capabilities to enable communication (e.g., data transfer) between the AWGS 220 and the network 240. As shown in FIG. 2, the example AWGS 220 and the example network 240 include the capabilities to transmit and/or receive asset information through the example wireless communication system 260 (e.g., the cellular communication system, the satellite communication system, the air band radio communication system, the Aircraft Communications Addressing and Reporting System (ACARS), etc.) via the example wireless communication links 270.

The wireless communication links 270 of the illustrated example of FIG. 2 are cellular communication links. However, any other method and/or system of communication can additionally or alternatively be used such as an Ethernet connection, a Bluetooth connection, a Wi-Fi connection, a satellite connection, etc. Further, the example wireless communication links 270 of FIG. 2 can implement cellular connections via a Global System for Mobile Communications (GSM). However, any other systems and/or protocols for communications can be used such as Time Division Multiple Access (TDMA), Code Division Multiple Access (CDMA), Worldwide Interoperability for Microwave Access (WiMAX), Long Term Evolution (LTE), etc.

Figure 3:
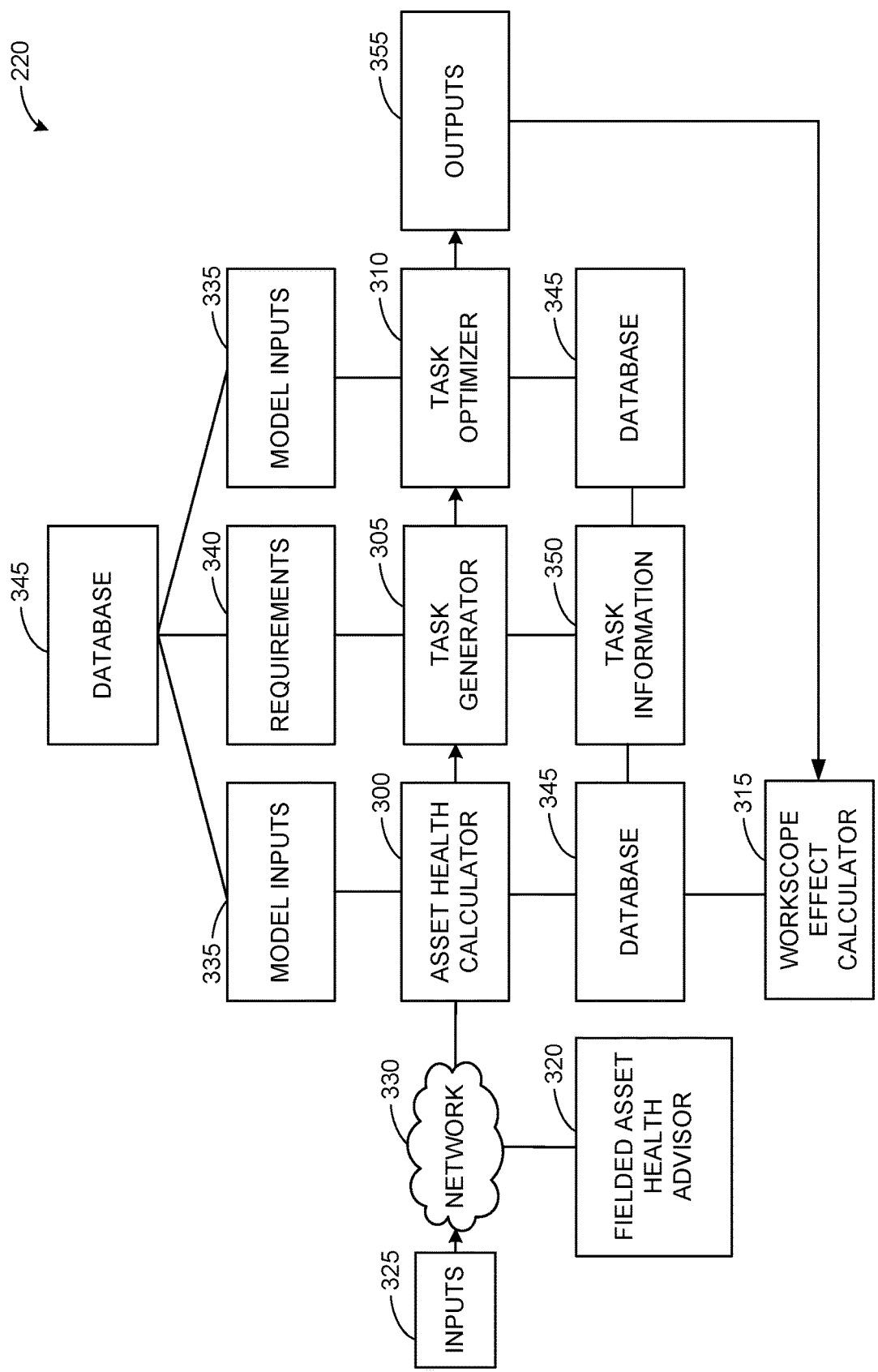
FIG. 3 is a block diagram of an example implementation of the example asset workscope generation system of FIG. 2.

FIG. 3 is a block diagram of an example implementation of the example AWGS 220 of FIG. 2. The example AWGS 220 includes an example asset health calculator 300, an example task generator 305, an example task optimizer 310, an example workscope effect calculator 315, an example fielded asset health advisor (FAHA) 320, example inputs 325, an example network 330, example model inputs 335, example requirements 340, an example database 345, example task information 350, and example outputs 355.

In the illustrated example of FIG. 3, the AWGS 220 includes the example asset health calculator 300 to identify a target asset such as the engine 102 of FIG. 1 for removal to perform a task to improve an operating condition of the target asset. In some examples, the asset health calculator 300 calculates an actual asset health quantifier (AHQ) of an asset based on the inputs 325 (e.g., asset sensor data, engine control inputs, etc.) obtained via the network 330. The example network 330 can implement or correspond to the example network 240 of FIG. 2. For example, the asset health calculator 300 can obtain inputs based on an inspection of the asset by an asset maintenance technician. In another example, the asset health calculator 300 can obtain asset information from the turbine engine controller 100 of the engine 102 of FIGS. 1-2 via the AWGS direct connection 230 of FIG. 2, the AWGS network connection 250 of FIG. 2, the wireless communication links 270 of FIG. 2, etc.

In some examples, the asset health calculator 300 calculates a projected AHQ based on the model inputs 335. For example, the asset health calculator 300 can estimate an operating condition of the engine 102 after the engine 102 completes a specified number of cycles (e.g., flight cycles, operation cycles, etc.). For example, the asset health calculator 300 can simulate the engine 102 completing the specified number of flight cycles by executing a digital twin model of the engine 102 for the specified number of flight cycles. As used herein, the term "flight cycle" refers to a complete operation cycle of an aircraft flight executed by an asset including a take-off operation and a landing operation.

As used herein, the term "digital twin" refers to a digital representation, a digital model, or a digital "shadow" corresponding to a digital informational construct about a physical system. That is, digital information can be implemented as a "twin" of a physical device/system (e.g., the engine 102, etc.) and information associated with and/or embedded within the physical device/system. The digital twin is linked with the physical system through the lifecycle of the physical system. In certain examples, the digital twin includes a physical object in real space, a digital twin of that physical object that exists in a virtual space, and information linking the physical object with its digital twin. The digital twin exists in a virtual space corresponding to a real space and includes a link for data flow from real space to virtual space as well as a link for information flow from virtual space to real space and virtual sub-spaces. The links for data flow or information flow correspond to a digital thread that represents a communication framework between sources of data and the digital twin model. The digital thread can enable an integrated view of asset data throughout a lifecycle of the asset. For example, the digital twin model can correspond to the virtual model of the asset and the digital thread can represent the connected data flow between an asset data source and the virtual model.

In some examples, the asset health calculator 300 identifies a target asset for removal based on comparing an actual AHQ to an actual AHQ threshold and identifying the target asset for removal based on the comparison. In some examples, the asset health calculator identifies a target asset for removal based on comparing a projected AHQ to a projected AHQ threshold and identifying the target asset for removal based on the comparison. In some examples, the asset health calculator 300 generates a removal schedule for one or more target assets based on requirements such as contractual requirements, maintenance resources, spare part inventory, etc., and/or a combination thereof.

In some examples, the AHQ threshold (e.g., the actual AHQ threshold, the projected AHQ threshold, etc.) of an asset, an asset component, etc., represents an indicator, which when satisfied, corresponds to the asset, the asset component, etc., being identified as a candidate for removal to perform maintenance, service, etc. For example, the asset health calculator 300 can compare an actual AHQ of 50 cycles (e.g., flight cycles, flight operations, etc.) remaining (e.g., until service can be performed, until the asset component is taken off-wing, etc.) for the booster compressor 114 of FIG. 1 to an actual AHQ threshold of 100 cycles remaining and identify the booster compressor 114 of FIG. 1 as a candidate for removal based on the actual AHQ being less than the actual AHQ threshold. In another example, the asset health calculator 300 can compare an actual AHQ of 200 hours operating remaining for the booster compressor 114 of FIG. 1 to an actual AHQ threshold of 250 hours operating remaining and identify the booster compressor 114 of FIG. 1 as a candidate for removal based on the actual AHQ being less than the actual AHQ threshold. For example, the actual AHQ threshold, the projected AHQ threshold, etc., can be determined based on a contractual requirement, historical-based information of previously repaired assets and/or asset components, etc.

In the illustrated example of FIG. 3, the AWGS 220 includes the task generator 305 to generate a workscope task for the target asset based on obtaining an AHQ from the asset health calculator 300. For example, the task generator 305 can obtain an AHQ for the engine 102, an AHQ for the booster compressor 114 of the engine 102, etc. In some examples, the task generator 305 identifies an asset component to be processed based on comparing an AHQ to an AHQ threshold and identifying the asset component based on the comparison. For example, the task generator 305 can compare an actual AHQ of 30% useful life remaining for the booster compressor 114 to an actual AHQ threshold of 50% useful life remaining and identify the booster compressor 114 for replacement based on the actual AHQ being less than the actual AHQ threshold.

In some examples, the task generator 305 identifies an asset component to be processed based on the requirements 340 obtained from the database 345. For example, the task generator 305 can compare an actual AHQ of 100 cycles for the booster compressor 114 to an actual AHQ threshold of 200 cycles for the booster compressor 114 based on contractual requirements (e.g., a contract specifies that a booster compressor must be serviced when the actual AHQ goes below 200 cycles). In such an example, the task generator 305 can identify the booster compressor 114 for processing based on the actual AHQ being less than the actual AHQ threshold.

In response to identifying one or more asset components to be processed, the example task generator 305 can generate a set of workscope tasks that can be performed on the one or more asset components. For example, the task generator 305 can determine the set of tasks based on obtaining the task information 350 from the database 345. For example, the task generator 305 can query the database 345 with the identified component for processing (e.g., the booster compressor 114) and the actual AHQ of the component, and the database 345 can return task information including a list of tasks that can be performed with corresponding costs (e.g., labor costs, monetary costs, etc.), spare parts, tools, etc., for each task in the list.

In the illustrated example of FIG. 3, the AWGS 220 includes the task optimizer 310 to identify an optimized and/or otherwise improved workscope for a target asset based on the generated workscope tasks for the target asset and the model inputs 335. For example, the task optimizer 310 can generate a plurality of workscopes in which each workscope includes a combination of one or more of the workscope tasks obtained from the task generator 305. In such an example, the task optimizer 310 can store the plurality of workscopes in the database 345.

In some examples, the task optimizer 310 calculates an estimate asset health quantifier for the target asset to generate quantifiable metrics to evaluate an accuracy or an efficiency of the AWGS 220 in improving an operating condition of the engine 102. For example, the task optimizer 310 can calculate an asset health quantifier for the target asset in response to performing a specified workscope on the target asset. For example, the task optimizer 310 can obtain an actual AHQ of the target asset calculated by the asset health calculator 300, select a workscope of interest for the target asset, and calculate an estimate AHQ of the target asset if the selected workscope were to be performed on the target asset. In some examples, the workscope effect calculator 315 calculates an actual AHQ of the target asset after the selected workscope is completed on the target asset and compares the actual AHQ to the estimate asset health quantifier calculated by the task optimizer 310 to determine an accuracy of the AWGS 220 based on the comparison.

In some examples, the task optimizer 310 calculates an estimate AHQ by executing one or models such as a digital twin model of the target asset to generate the model inputs 335. For example, a digital twin model can be implemented using an artificial neural network and/or other machine learning/artificial intelligence to form connections between inputs and outputs and drive evaluation and behavior through patterns, feedback, optimization, etc.

In some examples, the task optimizer 310 calculates an estimate asset health quantifier for each one of the generated workscopes. In some examples, the task optimizer 310 selects a workscope to be performed on the target asset based on one or more factors such as comparisons of the calculated estimate asset health quantifiers to contractual requirements, customer requirements, operational constraints, etc., and/or a combination thereof. In such examples, the outputs 355 correspond to the selected workscope including a set of tasks to be performed on the target asset and corresponding workscope information. For example, the workscope information can include an assignment of maintenance personnel, a service facility, spare parts, tools, etc., to the workscope based on a removal schedule identified by the asset health calculator 300.

In the illustrated example of FIG. 3, the AWGS 220 includes the workscope effect calculator 315 to generate a predictive asset health quantifier of a turbine engine. For example, the workscope effect calculator 315 can determine one or more de-rate parameters of the turbine engine based on the inputs 325. For example, the workscope effect calculator 315 can determine a value for a takeoff de-rate parameter, a climb de-rate parameter, etc., of the engine 102. The example workscope effect calculator 315 can analyze the de-rate parameters to identify opportunities for increasing TOW, lowering turbine engine maintenance cost, etc., of the engine 102 while respecting operator metrics (e.g., fuel burn, mission times, etc.).

In some examples, the workscope effect calculator 315 generates asset and/or asset component performance and severity models based on the deviations. For example, the workscope effect calculator 315 can translate the impact of environmental factors, operational factors, etc., to asset and/or asset component health factors that drive maintenance operations of the asset and/or the asset components. In some examples, the workscope effect calculator 315 generates a severity model using historical information. For example, the workscope effect calculator 315 can generate an asset health quantifier of an asset component as a function of TOW and an environmental or an operational condition. For example, the workscope effect calculator 315 can generate a severity model that maps TOW of an asset component such as a high-pressure compressor to one or more environmental parameters of significance to component life (e.g., TOW, etc.).

In some examples, the workscope effect calculator 315 generates recommendations to optimize and/or otherwise improve operator behavior corresponding to takeoff de-rate parameters, climb de-rate parameters, etc., when the asset is on-wing of an aircraft. For example, the workscope effect calculator 315 can generate a recommendation to adjust the operator behavior to increase TOW and improve turbine engine performance. For example, the workscope effect calculator 315 can generate a recommendation to change a climb time, a taper schedule (e.g., a turbine engine de-rate taper schedule, etc.), a de-rate parameter, etc., of the asset when on-wing of the aircraft. As used herein, the term "taper schedule" refers to a scheduled de-rating operation of a turbine engine as the turbine engine transitions between flight segments of a flight cycle. For example, the taper schedule can include instructions to operate the turbine engine at 5% de-rate during a takeoff and departure flight segment, at 15% de-rate during a climb flight segment, and at 40% de-rate during a cruise flight segment.

In some examples, the workscope effect calculator 315 generates a report including the recommendations. For example, the workscope effect calculator 315 can generate a report including a candidate improvement plan for identified operators as candidate improvement targets. For example, the candidate improvement plan can include a recommendation to change the climb time, the taper schedule, the de-rate parameter, etc., of the asset when on-wing of the aircraft. In some examples, the workscope effect calculator 315 generates an alert dashboard (e.g., an alert dashboard in a report, an alert dashboard in a web-based software application, etc.) indicating areas of improvement for an operator to improve TOW and to reduce maintenance cost of an asset.

In some examples, the workscope effect calculator 315 calculates an effect of performing a workscope on a target asset. In some examples, the workscope effect calculator 315 calculates a workscope quantifier which represents an accuracy or an efficiency of the AWGS 220 in improving an operating condition of the engine 102. In some examples, the workscope effect calculator 315 calculates an actual AHQ of the target asset in response to the selected workscope being performed on the target asset. In some examples, the workscope effect calculator 315 calculates the actual AHQ based on an inspection (e.g., a visual inspection, etc.) from maintenance personnel, sensor data from the sensors 144, 146 of FIG. 2, etc., and/or a combination thereof. For example, the workscope effect calculator 315 can calculate an actual AHQ of the high-pressure turbine 120 based on comparing (1) a first pressure value and/or a first temperature value of the high-pressure turbine 120 obtained from the sensors 144, 146 of FIG. 2 prior to the selected workscope being performed to (2) a second pressure value and/or a second temperature value of the high-pressure turbine 120 obtained from the sensors 144, 146 after the selected workscope being performed. In such an example, the workscope effect calculator 315 can calculate the actual AHQ based on the comparison.

In some examples, the workscope effect calculator 315 calculates a workscope quantifier based on comparing a first asset health quantifier of a target asset to a second asset health quantifier of the target asset. For example, the workscope effect calculator 315 can calculate a workscope quantifier based on a first actual AHQ calculated by the task optimizer 310 prior to a workscope being performed on the engine 102 and a second actual AHQ calculated by the workscope effect calculator 315 after a completion of the workscope. For example, the workscope quantifier can be a difference between the first and the second actual AHQ, a ratio of the first and the second actual AHQ, etc. For example, the workscope effect calculator 315 can calculate a workscope quantifier of 10% based on a difference between a first actual AHQ of 90% calculated by the task optimizer 310 and a second actual AHQ of 80% calculated by the workscope effect calculator 315 (e.g., 10%=90%-80%, etc.). In such an example, the workscope effect calculator 315 can determine that the AWGS 220 can be improved because the selected workscope did not improve an operating condition of the engine 102 to a level anticipated by the AWGS 220.

In some examples, the workscope effect calculator 315 modifies one or more components of the AWGS 220 based on the operator behavior (e.g., a de-rating behavior of owner assets, etc.). In some examples, the workscope effect calculator 315 modifies the one or more components of the AWGS 220 by calculating a workscope quantifier, comparing the workscope quantifier to a workscope quantifier threshold, and determining whether the workscope quantifier satisfies the workscope quantifier threshold based on the comparison. In some examples, the workscope quantifier threshold represents an indicator which, when satisfied, identifies that the AWGS 220 can be improved by updating one or more components of the AWGS 220. For example, the workscope effect calculator 315 can obtain a first actual AHQ for the booster compressor 114 from the database 345 corresponding to an actual AHQ of 90% useful life remaining calculated by the task optimizer 310. The example workscope effect calculator 315 can generate a second actual AHQ of 70% useful life remaining based on an inspection of the booster compressor 114, the sensor data from the sensors 144, 146, etc.

The example workscope effect calculator 315 can calculate a workscope quantifier of 20% based on calculating a difference between the first and the second actual AHQ (e.g., 20%=90%-70%, etc.). In another example, the workscope effect calculator 315 can calculate a workscope quantifier of 0.78 based on calculating a ratio of the first and the second actual AHQ (e.g., 0.78=0.70÷0.90, etc.). In such an example, the workscope effect calculator 315 can compare the workscope quantifier of 0.78 to a workscope quantifier threshold of 0.85 and determine whether the workscope quantifier satisfies the workscope quantifier threshold. For example, the workscope effect calculator 315 can determine to modify a component of the AWGS 220 based on the workscope quantifier being less than the workscope quantifier threshold.

In response to determining that the workscope quantifier satisfies the workscope quantifier threshold, the example workscope effect calculator 315 can regenerate the example asset health calculator 300, the example task generator 305, the example task optimizer 310, the example model inputs 335, the example requirements 340, the example database 345, the example task information 350, etc., and/or a combination thereof. For example, the workscope effect calculator 315 can direct a digital twin model of the engine 102 to update to a latest version of the digital twin model incorporating up-to-date historical trend information, model parameters, model algorithms, etc. In another example, the workscope effect calculator 315 can direct the database 345 to update to include a latest version of the task information 350. In yet another example, the workscope effect calculator 315 can direct the task optimizer 310 to update one or more algorithms, calculation parameters, etc., used by the task optimizer 310 to a latest version.

In the illustrated example of FIG. 3, the AWGS 220 includes the FAHA 320 to generate a recommendation to improve operational usage of an asset. In the illustrated example, the FAHA 320 includes the asset health calculator 300. In some examples, the FAHA 320 obtains sensor data from the sensors 144, 146 of FIG. 2, model information (e.g., outputs from a physics-based model of an asset, a stochastic model of an asset, etc.), etc., to generate analytics and diagnostics corresponding to a health of the asset. For example, the FAHA 320 can be a software application executing on a computing device (e.g., a desktop computer, a tablet, a smartphone, etc.) to generate asset health information (e.g., an actual AHQ, a projected AHQ, etc.), asset usage recommendations, etc. In other examples, the FAHA 320 can be implemented as a dedicated hardware device (e.g., an application-specific integrated circuit, firmware device, etc.) to monitor asset operation and generate asset health information, asset usage recommendation, etc.

In the illustrated example, the FAHA 320 is communicatively coupled to the network 330. For example, the FAHA 320 can obtain sensor data from the sensors 144, 146, obtain an up-to-date version of one or more models, obtain an up-to-date version of an algorithm or a calculation parameter used by the asset health calculator 300, etc., via the network 330. Alternatively, the example FAHA 320 may not be communicatively coupled to the network 330.

In the illustrated example of FIG. 3, the AWGS 220 includes the database 345 to record data (e.g., asset health quantifiers, workscope quantifiers, the inputs 325, the model inputs 335, the requirements 340, the task information 350, etc.). In the illustrated example, the database 345 is communicatively coupled to the asset health calculator 300, the task generator 305, the task optimizer 310, the workscope effect calculator 315, and the FAHA 320 (e.g., when communicatively coupled to the network 330, etc.). The example database 345 can respond to queries for information related to data in the database 345. For example, the database 345 can respond to queries for additional data by providing the additional data (e.g., the one or more data points), by providing an index associated with the additional data in the database 345, etc. The example database 345 can additionally or alternatively respond to queries when there is no additional data in the database 345 by providing a null index, an end of database identifier, etc. For example, the asset health calculator 300 can query the database 345 for asset sensor data, asset environmental data, utilization data, etc., corresponding to the engine 102. In response to the query, the example database 345 can transmit the data and corresponding information such as data logs, maintenance history, etc., to the example asset health calculator 300.

The example database 345 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 345 can additionally or alternatively be implemented by one or more double data rate (DDR) memories, such as DDR, DDR2, DDR3, DDR4, mobile DDR (mDDR), etc. The example database 345 can additionally or alternatively be implemented by one or more mass storage devices such as hard disk drive(s), compact disk drive(s) digital versatile disk drive(s), solid-state drives, etc. While in the illustrated example the database 345 is illustrated as a single database, the database 345 can be implemented by any number and/or type(s) of databases.

While an example implementation of the AWGS 220 of FIG. 2 is illustrated in FIG. 3, one or more of the elements, processes and/or devices illustrated in FIG. 3 may be combined, divided, re-arranged, omitted, eliminated and/or implemented in any other way. Further, the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 of FIG. 3 may be implemented by hardware, software, firmware and/or any combination of hardware, software and/or firmware. Thus, for example, any of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, and/or the example outputs 355 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AWGS 220 of FIG. 2 may include one or more elements, processes and/or devices in addition to, or instead of, those illustrated in FIG. 3, and/or may include more than one of any or all of the illustrated elements, processes and devices.

Figure 4:
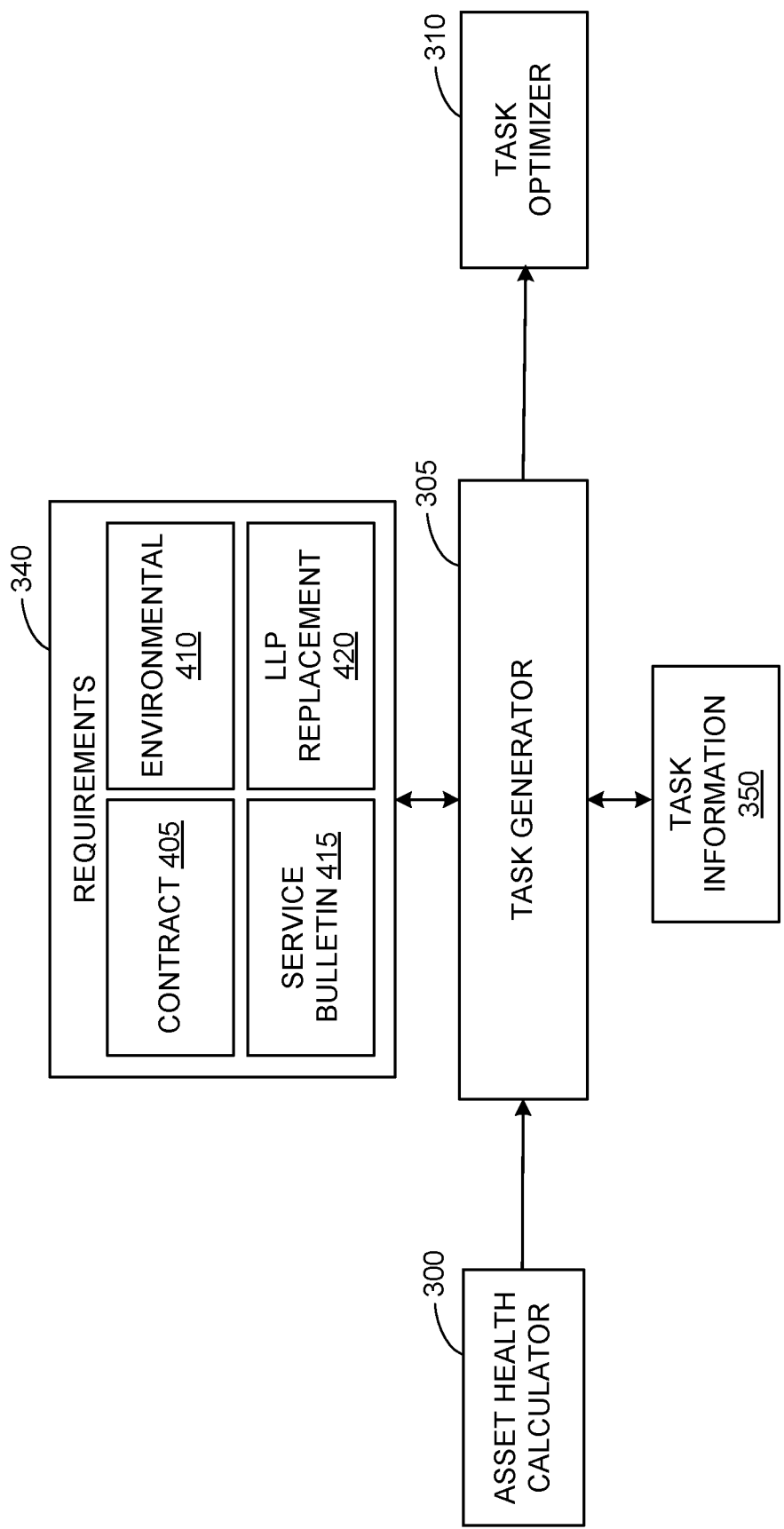
FIG. 4 is a block diagram of an example implementation of a portion of the example asset workscope generation system of FIGS. 2-3.

FIG. 4 is a block diagram of an example implementation of a portion of the AWGS 220 including the asset health calculator 300, task generator 305, task optimizer 310, requirements 340, and task information 350. The asset health calculator 300 provides input, such as overall asset health rank, component (e.g., asset module or part, etc.) health rank, etc., and the task generator 305 provides maintenance operations or tasks to the task optimizer 310 to generate and evaluate workscope options.

As shown in the example of FIG. 4, the requirements 340 include contract requirements 405, environment requirements 410, a service bulletin 415, life-limited part (LLP) replacement requirements 420, etc. Requirements 340 can be modeled via one or more of a deterministic model, probabilistic model, physics-based model, durability model, etc. For example, a digital twin, neural network, and/or other machine learning network, etc., can be used to form a model of a contract, environment, service bulletin, life limited part trajectory, etc., and associated requirements.

In the illustrated example of FIG. 4, the task information 350 includes information regarding tasks involved in maintenance operations. For example, each maintenance operation includes one or more tasks, where each task has corresponding information such as type and quantity of personnel to complete the task, components and/or tools needed to complete task, time and cost to complete task, etc.

The task information 350 and requirements 340 provide input to the task generator 305 to generate a series of tasks to prepare and/or otherwise maintain an asset for a next mission, for example. The task generator 305 generates list or other set of potential maintenance operations that can be completed within a next shop visit or subsequent shop visit(s) for a target asset. In certain examples, each maintenance operation can be assigned a criticality index or quantifier to drive minimum workscope, for example.

For example, time on wing and shop cost for a target asset are related by workscope. Balancing Customized Service Agreement (CSA) durability, operability and performance requirements with financial metrics is a multidimensional optimization problem with millions of solutions. The task generator 305 analyzes possibilities and presents top candidates based on input criteria including requirements 340 and task information 350 to generate potential tasks or operations with respect to the target asset. Evaluating all the possibilities manually is impossible.

Figure 5A:
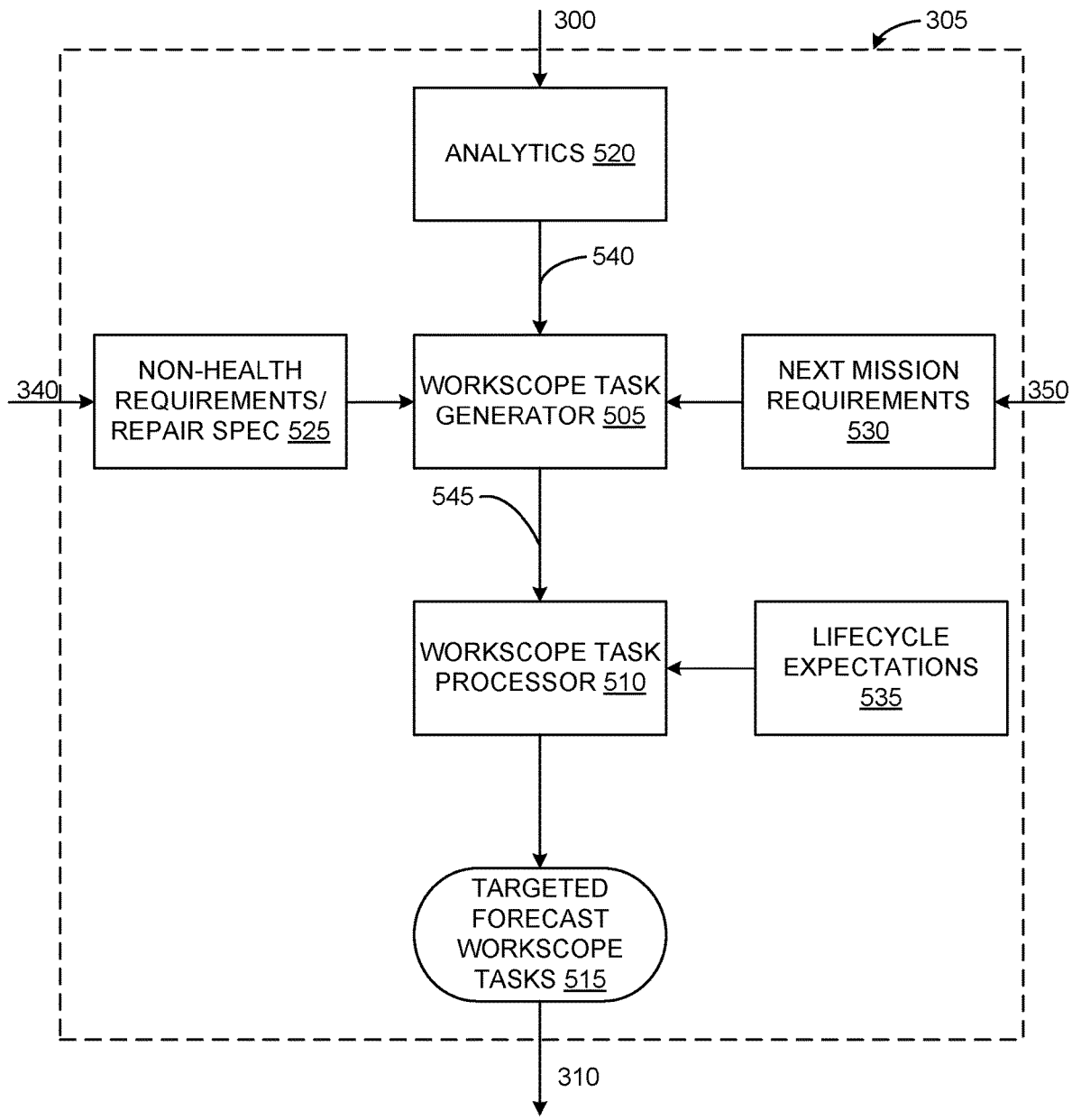
FIGS. 5A-5B are block diagram of example implementations of the example task generator of FIGS. 3-4.

FIG. 5A is a block diagram of an example implementation of the example task generator 305 of FIGS. 3-4. In the illustrated example of FIG. 5A, the task generator 305 includes a workscope task generator 505 and a workscope task processor 510 which work together to generate targeted forecast workscope tasks 515 for a particular goal, mission, etc. As shown in the example of FIG. 5A, analytics 520, non-health requirements 525 such as a repair specification, etc., and next mission requirements 530 provide input to the workscope task generator 505. Lifecycle expectations 535 provide input to the workscope task processor 510.

For example, the workscope task generator 505 processes analytics 520 generated as a result of the asset health calculation, including asset health rank, etc., from the asset health calculator 300. Asset health can be modeled using a physics-based model (e.g., a digital twin, neural network, etc.) of the asset (e.g., a turbine engine, diesel engine, other electromechanical device, etc.), for example. Asset health can be modeled while the asset is still fielded (e.g., the engine is still on-wing, etc.), for example. In addition to modeling current asset health, a future health or life expectancy for the asset can be determined by the model and/or other analytics 520. The health analytics 520 generate an asset health state 540 (e.g., a health level and/or life expectancy, etc.) for the asset, which is provided to the workscope task generator 505.

The workscope task generator 505 combines the asset health state analytics 540 including health level and life expectancy for the target asset with non-health requirements 525 (e.g., a repair specification, service bulletin, life-limited part information, etc.) and next mission requirements 530 (e.g., build-to-achieve functionality for a certain goal, objective, mission, etc.) to generate mission-specific workscope tasks 545 based on mission requirements 530 as constrained by non-health requirements 525 applicable to the target asset.

The workscope task processor 510 receives the mission-specific workscope tasks 545 generated from asset health state information 540, next mission requirements 530, and non-health requirements 525 and generates targeted forecast workscope tasks 515. The workscope task processor 510 processes the tasks 545 based on lifecycle expectations 535 for the asset to evaluate whether the tasks 545 fit the lifecycle expectations 535 for the asset (e.g., will the task(s) 545 help the asset to last to meet the lifecycle expectation 535 enumerated in the contract, will the task(s) 545 be insufficient to maintain a desired and/or required asset health state for the life of the contract, will the task(s) 545 be unnecessary to maintaining the required/desired asset health state for the next mission and remaining life of the contract, etc.).

Figure 5B:
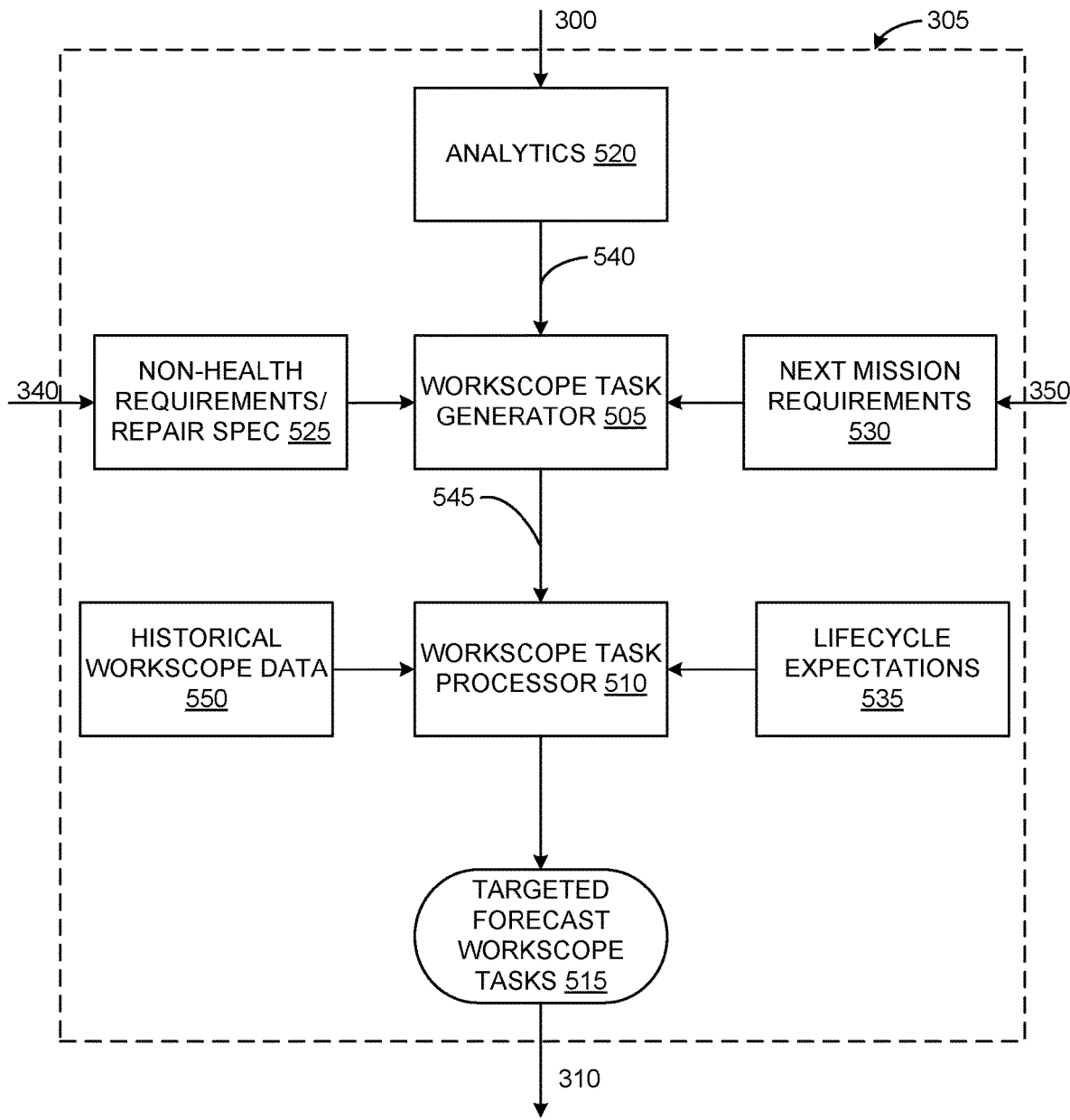

As shown in the example of FIG. 5B, historical workscope data 550 can also be provided to the workscope task processor 510 to further refine the forecast of targeted workscope tasks 515 for a next mission based on feedback from prior missions the same as or similar to the next mission provided 530. The historical data 550 provides example(s) of prior settings, tasks, resources, etc., for a related workscope as well as a measurement, evaluation, and/or other feedback regarding workscope effect on the asset and/or asset environment from the prior workscope, for example. Such historical data and/or other feedback can help improve the generation of forecasted workscope tasks 515 by the task generator 305.

Thus, the workscope task processor 510 refines the mission-specific workscope tasks based on lifecycle expectations and historical workscope data to provide targeted forecast workscope tasks 515. In certain examples, the task optimizer 310 processes the workscope tasks 515 among a plurality of available workscope options to generate an "optimal" workscope. In certain examples, the task generator 305 estimates mission specific targeted workscopes by asset module and part using: 1) assessed individual asset health state/life expectancy; 2) business, contractual and technical requirements; 3) subsequent asset mission/lifecycle requirements; and 4) historical and analytic-based workscope versus asset health recovery assessments. The targeted forecast workscope tasks 515 provide input to target asset repair/maintenance and supporting material/tooling to specific asset health issues to minimize or otherwise reduce costs/equipment down time while achieving the asset post-repair/maintenance mission. For example, the tasks 515 specify an asset (or asset part, module, etc.) to be maintained (e.g., repaired, replaced, etc.), a timing for the maintenance, an expected duration for the maintenance, a location for the maintenance, materials involved in the maintenance, tooling used in the maintenance, personnel involved in the maintenance, etc.

In certain examples, the generated tasks 515 are generated by the task generator 305 taking into account an impact on the fielded asset's environment (e.g., an airplane on which the engine is mounted, etc.). In certain examples, the generated tasks 515 are generated by the task generator 305 taking in account a fleet- and/or other organization-wide impact (e.g., an entire fleet of aircraft scheduled with the aircraft whose engine is undergoing maintenance including engines on other aircraft in the fleet that may need maintenance as well, etc.). Tasks 515 can be generated for the next mission and/or to maximize work done while the asset is in the shop, for example. The tasks 515 can be generated and appropriate resources notified before the asset is removed from the field, for example. For example, a replacement (e.g., loaner, etc.) engine can be located and allocated to an aircraft whose engine will then be scheduled to come off-wing at a time when the aircraft is idle for engine maintenance to be completed by the aircraft's next idle period to be placed back on-wing in a state satisfying safety concerns, contract obligations, etc.

Figure 6:
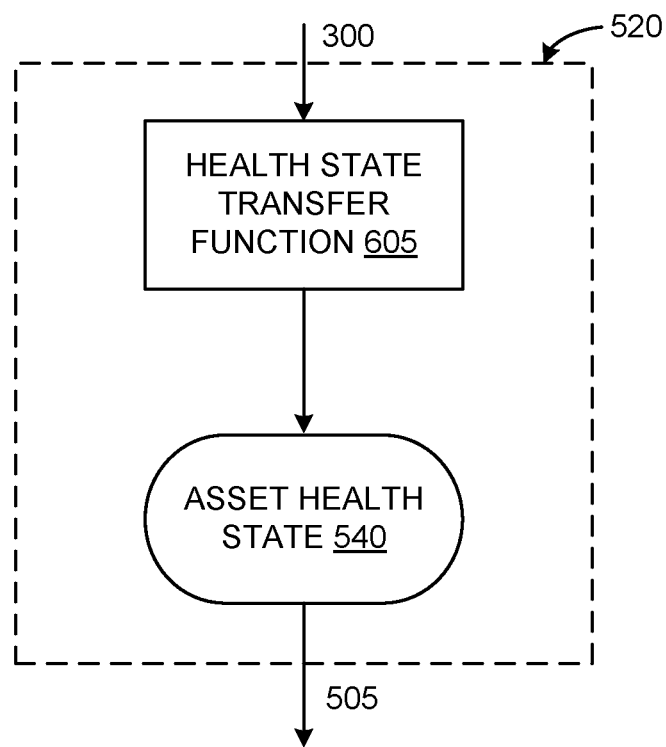
FIGS. 6-7 illustrate example implementations of the health state analytics of FIGS. 5A-5B.

FIG. 6 illustrates an example implementation of the health state analytics 520 of FIGS. 5A-5B. As shown in the example of FIG. 6, the analytics 520 can be implemented using a health state transfer function 605 to process asset health quantifier output from the asset health quantifier 300 to generate an asset health state 540 to provide to the workscope task generator 505. The example health state transfer function 605 leverages the overall and component asset health quantifiers provided by the asset health quantifier 300 as well as forecast utilization and environmental information for the target asset, etc. Based on asset health information, such as useful life remaining (ULR) of the asset (e.g., at a device and/or component/part/module level, etc.), feedback between a predicted ULR and measured ULR for a prior workscope, modeled digital twin and/or other asset health modeling output/prediction, the health state transfer function 605 provides an indication of current operating health and/or predicted future health of the asset to the workscope task generator 505, which combines the indication of asset health with non-health requirements (e.g., contract requirement 405, environment factor 410, service bulletin 415, and/or LLP replacement 420, etc.,) and next mission requirements 530 to generate mission-specific workscope tasks 545, for example.

For example, the health state transfer function 605 utilizes available input data to model and/or otherwise quantify a current asset health state and an estimated or projected ULR for the target asset from a current point in time to a target point in time for asset removal (e.g., a contract end of life, etc.). The health state transfer function 605 takes into account one or more factors or aspects such as performance, operability, durability, etc., for the target asset, a module of the target asset, a component or part of the target asset, etc., to provide health state information to be used for comparison to requirements and development of associated workscope tasks, for example.

Figure 7:
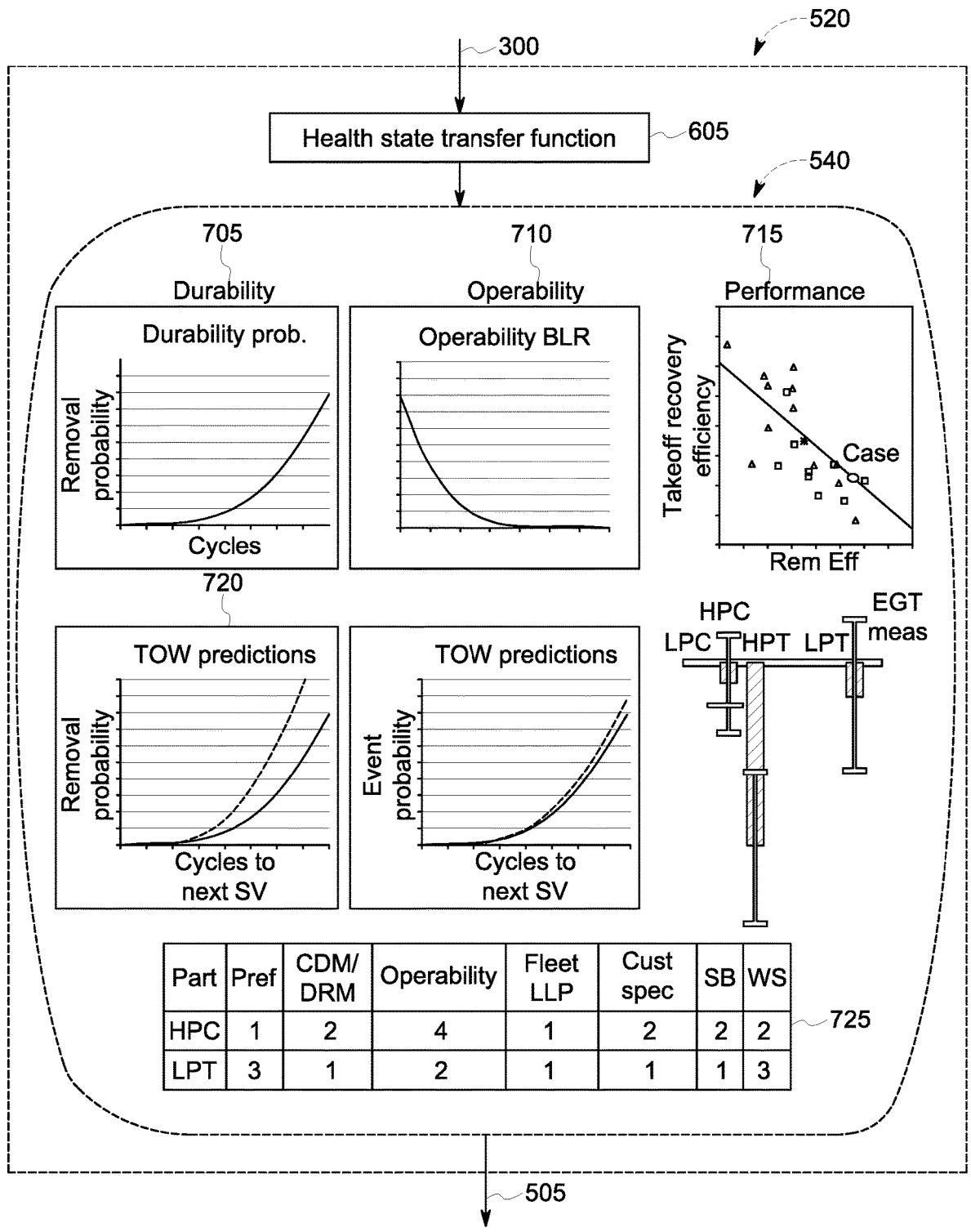

FIG. 7 illustrates another implementation of the example analytics 520 including the health state transfer function 605 providing asset health information 540 modeled in a plurality of ways. For example, the health state transfer function 605 can generate a probability of asset durability 705, asset operability 710, asset performance 715, time-on-wing prediction 720, etc. In certain examples, the asset health information 540 can include a data structure 725 relating to asset part and associated parameters (e.g., performance, cumulative damage model, distress rank model, operability, fleet LLP, customer specification, service bulletin, cumulative workscope, etc.).

Thus, as shown in the example of FIG. 7, a part, such as a high pressure compressor (HPC), low pressure turbine (LPT), low pressure compressor (LPC), high pressure turbine (HPT), etc., can be analyzed to generate the data structure 725 of parameters for fusion with removal analytic, lifecycle, service bulletin, and/or other information by the workscope task generator 505 and the workscope task processor 510, for example. As shown in the example of FIG. 7, the asset health state 540 can be modular, including performance, durability, etc., for flowpath and/or non-flowpath asset data.

For example, the health state transfer function 605 utilizes available input data to model and/or otherwise quantify a current asset health state and an estimated or projected ULR for the target asset from a current point in time to a target point in time for asset removal (e.g., a contract end of life, etc.). The health state transfer function 605 takes into account one or more factors or aspects such as durability 705, operability 710, performance 715, time-on-wing 720, etc., for the target asset, a module of the target asset, a component or part of the target asset, etc., to provide health state information to be used for comparison to requirements and development of associated workscope tasks, for example.

Thus, the example health state transfer function 605 can generate a model of asset health based on the asset health quantifier including durability 705, operability 710, performance 715. For example, the performance assessment 715 for an engine can quantify an impact of engine health state (e.g., current and forecasted, etc.) on gas temperature margin (e.g., exhaust gas temperature margin (EGTM), etc.).

For example, a health state can be quantified using a health state transfer function, $H_s$, as a combination of performance, operability, and durability representing a useful remaining life of the target asset, the asset including n parts, modules, and/or components:

$$H_S = \Sigma_{i=1}^{n}(f(P_i)+f(O_i)+f(D_i)) \quad \text{(Eq. 1)},$$

where $P_i$ represents a performance of part/module/component i, $O_i$ represents a operability of part/module/component i, and $D_i$ represents a durability of part/module/component i, for example.

Figure 8:
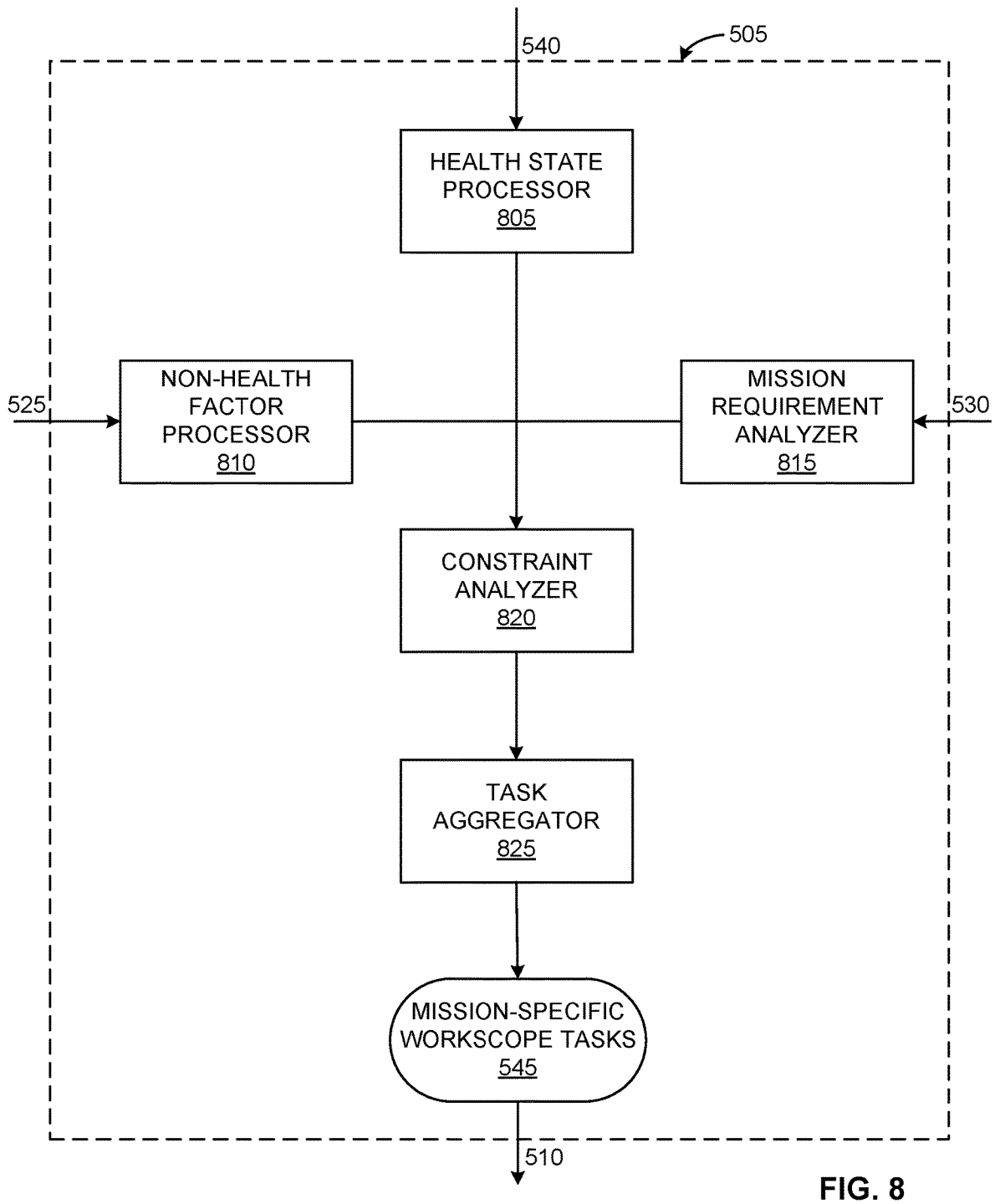
FIG. 8 illustrates an example implementation of the workscope task generator of FIGS. 5A-5B.

FIG. 8 illustrates an example implementation of the workscope task generator 505 of FIGS. 5A-5B. As shown in the example of FIG. 8, the example workscope task generator 505 includes a health state processor 805, a non-health factor processor 810, and a mission requirement analyzer 815 feeding into a constraint analyzer 820. The constraint analyzer 820 provides constraint information to a task aggregator 825 to aggregate tasks for a workscope based on asset health state, non-health factors, mission requirements, etc. The task aggregator 825 generates mission-specific workscope tasks 545 to provide to the workscope task processor 510.

As shown in the example of FIG. 8, the health state processor 805 receives asset health information 540 from the health analytics 520 and processes the asset health information 540 to determine asset health level, asset life expectancy, asset durability and performance (e.g., along an asset flowpath and/or non-flowpath, etc.), etc., and provides the determined health information to the constraint analyzer 820, which factors asset health into determining bounds or constraints by which tasks are generated to form a workscope for the target asset. For example, health state information can be provided for an asset, an asset module/part, a group of asset modules/parts, etc., to factor into task generation for the asset and/or module(s)/part(s) of the asset.

Additionally, the non-health factor processor 810 processes a repair specification and/or other non-health requirements 525 to provide further input to the constraint analyzer 820, which factors non-health requirements into determining constraints by which tasks are determined to form a workscope for the target asset, for example. The non-health factor processor 810 can generate a non-health state for the constraint analyzer 820 including life-limited part (LLP) expiration information, service bulletins indicating repair or replacement of part(s), contractual requirements providing certain action, etc.

The example mission requirement analyzer 815 processes next mission requirements 530 to determine what asset(s), asset capability(-ies), configuration(s), etc., are to be involved in a next mission for the target asset, for example. The mission requirement analyzer 815 provides requirements for a current, next, and/or subsequent mission to the constraint analyzer 820, which factors mission requirements into determining constraints by which tasks are determined to form a workscope for the target asset, for example. Thus, understanding what is expected of the asset (e.g., modeling usage of the asset, quantifying asset parameters, etc.) can help to determine tasks associated with maintenance of the asset.

The example constraint analyzer 820 processes input from the health state processor 805, the non-health factor processor 810, and the mission requirement analyzer 815 to develop a set of constraints on potential workscope tasks for the asset (e.g., by applying a workscope transfer function to the input, etc.). The constraints are provided to the task aggregator 825 which processes and aggregates tasks for the target asset in view of the health, non-health, and mission constraints. Thus, the workscope task generator 505 processes a plurality of different factors as inputs, motivation, requirements, and other constraints to generates tasks to be done with respect to an asset to maintain that asset for a particular mission.

For example, a workscope transfer function, $W_s$, can be used to quantify a set of constraints to be provided by the constraint analyzer 820 to guide the task aggregator 825 in forming a set of tasks to be executed to maintain the target asset at a desired health level for mission execution. The example workscope transfer function processes useful remaining life algorithms/models with Build to Achieve requirements to set the workscope to meet the Build to Achieve requirements for performance/operability/durability, etc. The workscope can be aggregated with the non-health state requirements and/or a lifecycle optimization, etc., to determine recommended workscope tasks:

$$W_S = f(H_S) - \Sigma_{j=1}^m (f(T_j) + f(R_j)) \quad \text{(Eq. 2)},$$

where $T_j$ represents a set of next mission tasks to be performed a target asset part/module/component j, and $R_j$ represents a set of non-health restrictions on a target asset part/module/component j, for example.

Figure 9:
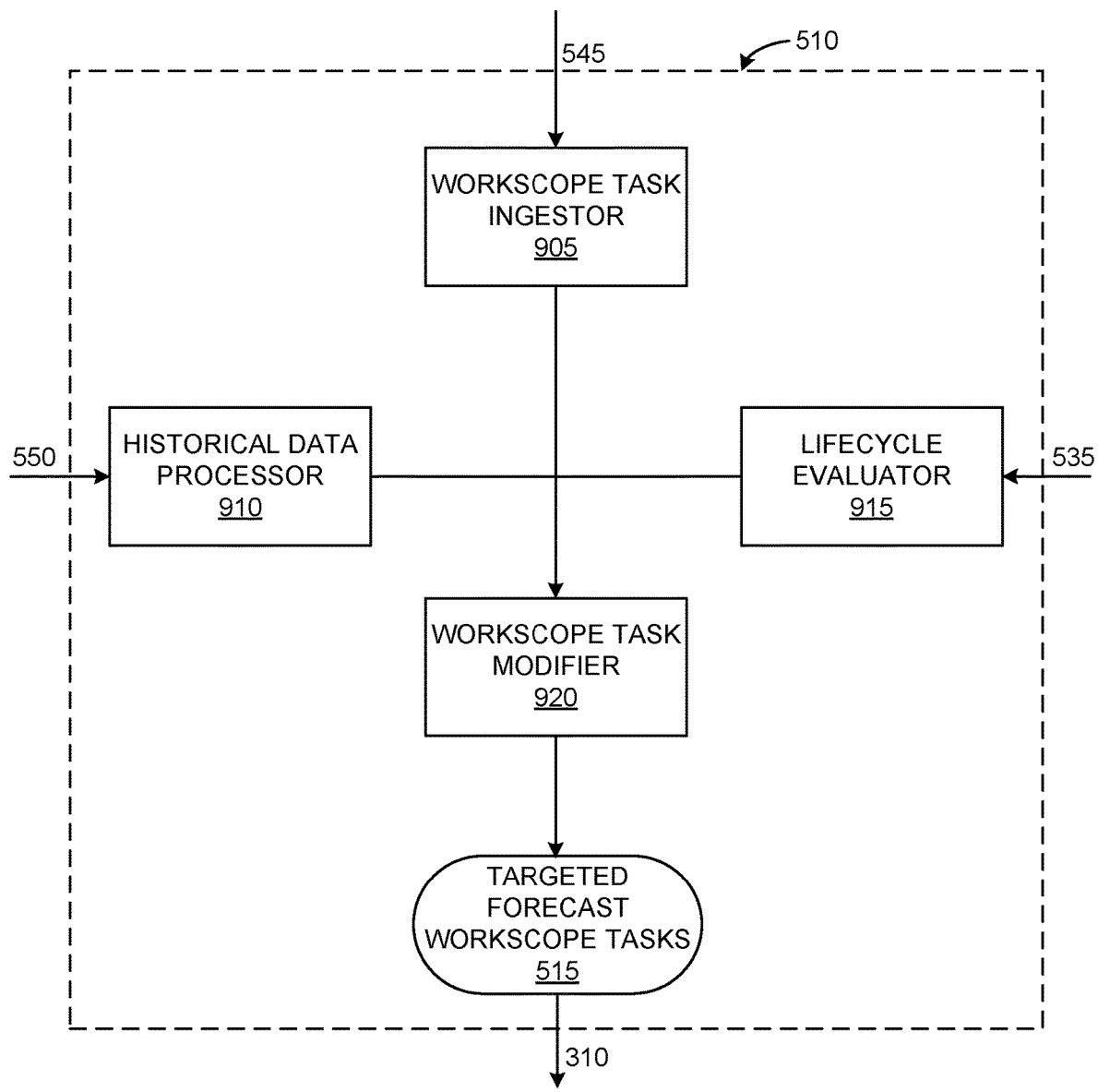
FIG. 9 illustrates an example implementation of the workscope task processor of FIGS. 5A-5B.

FIG. 9 illustrates an example implementation of the workscope task processor 510 of FIGS. 5A-5B. The example workscope task processor 510 receives mission-specific workscope tasks 545 from the workscope task generator 505 and applies lifecycle expectations 535 and/or historical workscope data 550 to the tasks 545 to generate targeted forecast workscope tasks 515 to be sent to the task optimizer 310.

The example workscope task processor 510 includes a workscope task ingestor 905, a historical data processor 910, a lifecycle evaluator 915, and a workscope task modifier 920 to produce targeted forecast workscope tasks 515. The example workscope task ingestor 905 receives and analyzes the tasks 545 from the workscope task generator 505. The workscope task ingestor 905 can determine parameters associated with the tasks 545, quantify the tasks 545 and/or resources involved in the tasks 545, model the tasks 545, etc. The workscope task ingestor 905 provides task information to the workscope task modifier 920.

The workscope task modifier 920 receives processed task information as well as lifecycle evaluation and historical data. The workscope task modifier 920 assesses lifecycle expectation, remaining useful life, probability of asset recovery probability of asset retention, next mission requirements, contractual obligations, etc., to forecast a targeted set of workscope tasks 310. Driven by technical constraints based on current asset (e.g., engine, etc.) health and time-on-wing requirements, as well as contractual constraints (e.g., obligations under a service contract, etc.), the workscope task modifier 920 generates tasks forming a workscope for maintenance of the target asset.

For example, expectations for asset lifecycle 535 (e.g., as defined by a contract, based on model, age and/or other status of the asset, etc.) are evaluated by the lifecycle evaluator 915 to modify the task information provided to the workscope task modifier 920 and adjust how the workscope task modifier 920 forecasts a set of targeted workscope tasks 515. Similarly, historical trends, prior workscope results, asset history, etc. 550, can be processed by the historical data processor 910 to modify the task information provided to the workscope task modifier 920 and adjust how the workscope task modifier 920 forecasts a set of targeted workscope tasks 515.

Thus, the workscope task processor 510 can generate targeted forecast workscope tasks 515 to meet asset requirements, fleet management needs, etc. In certain examples, a cost and/or criticality index or quantifier can be applied to one or more factors to weight the workscope task calculations for or against the respective factor. For example, if prolonging the lifespan of a turbine engine is of primary importance, then that lifecycle factor is weighted more heavily by the workscope task processor 510. If minimizing time off-wing is of most importance, then that timing factor and historical data regarding shop visit timing for the asset is weighted more heavily by the workscope task processor 510, for example. Increased accuracy, reduced shop turn-around time, and cost savings can be produced through the workscope tasks generated by the task generator 305 for task optimization 310.

While an example implementation of the task generator 305 of FIG. 3 is illustrated in FIGS. 4-9, one or more of the elements, processes and/or devices illustrated in FIGS. 4-9 can be combined, divided, re-arranged, omitted, eliminated and/or implemented in any other way. Further, the example workscope task generator 505, the example workscope task processor 510, the example asset health analytics 520, and/or, more generally, the example task generator 305 of FIG. 3 can be implemented by hardware, software, firmware and/or any combination of hardware, software and/or firmware. Thus, for example, any of the example workscope task generator 505, the example workscope task processor 510, the example asset health analytics 520, and/or, more generally, the example task generator 305 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workscope task generator 505, the example workscope task processor 510, the example asset health analytics 520, and/or, more generally, the example task generator 305 is/are hereby expressly defined to include a non-transitory computer readable storage device or storage disk such as a memory, a digital versatile disk (DVD), a compact disk (CD), a Blu-ray disk, etc. including the software and/or firmware. Further still, the example task generator 305 of FIG. 3 may include one or more elements, processes and/or devices in addition to, or instead of, those illustrated in FIGS. 4-9, and/or may include more than one of any or all of the illustrated elements, processes and devices.

Flowcharts representative of example machine readable instructions for implementing the AWGS 220 and/or its task generator 305 of FIGS. 2-9 are shown in FIGS. 10-13. In these examples, the machine readable instructions comprise a program for execution by a processor such as a processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 10-13, many other methods of implementing the example AWGS 220 and/or its task generator 305 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 10-13 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 10:
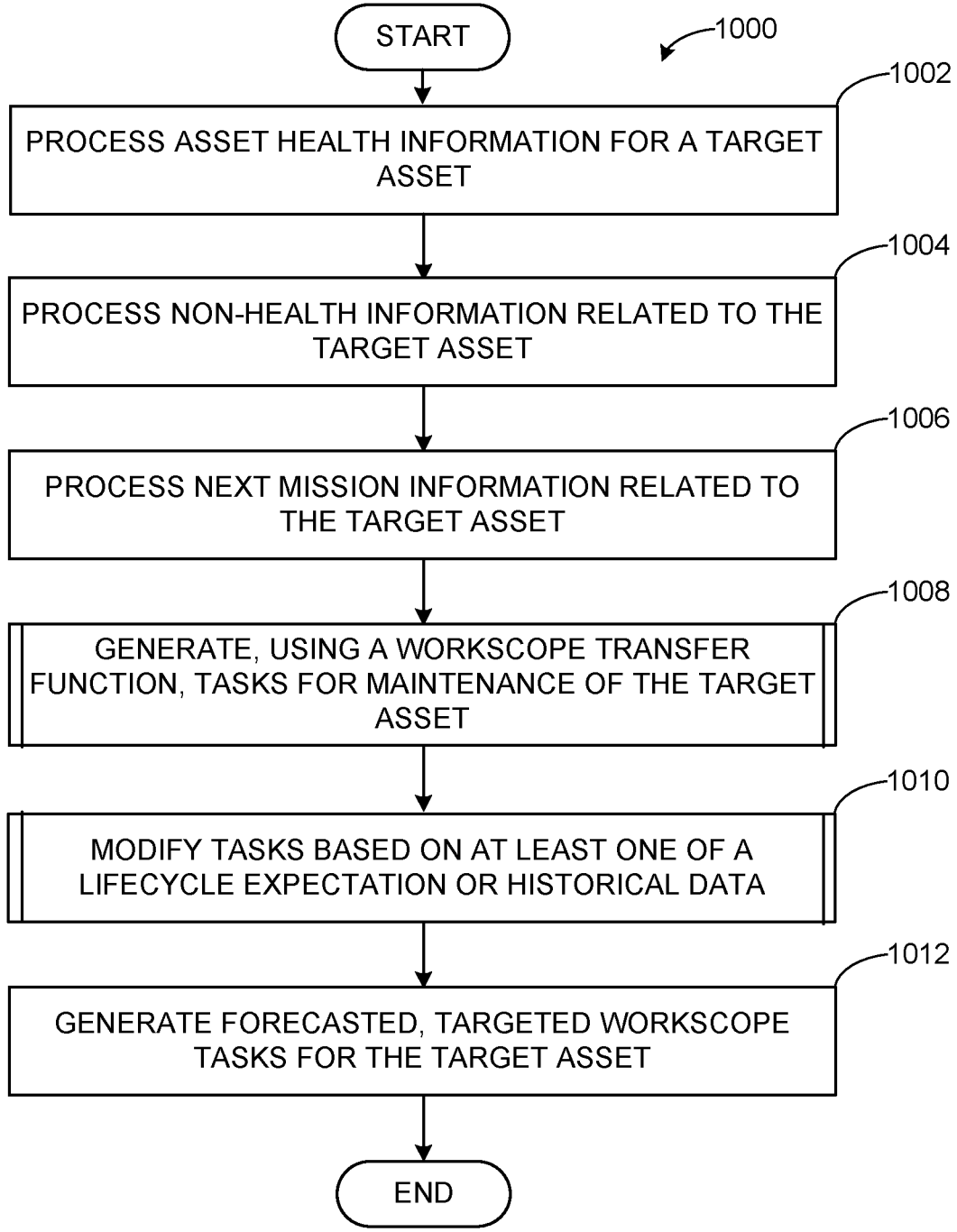
FIGS. 10-13 are flowcharts representative of an example method that can be executed by the example task generation system of FIGS. 3-9 to implement the examples disclosed herein.

FIG. 10 is a flowchart representative of an example method 1000 that can be performed by the example task generator 305 of FIGS. 2-9 to generate targeted workscope tasks. At block 1002, health information is processed with respect to a target asset. For example, the analytics 520 (e.g., including the health state transfer function 605 such as defined by Equation 1, etc.) can process the asset health calculation, including asset health rank, etc., provided by the asset health calculator 300. Asset health can be modeled using a physics-based model (e.g., a digital twin, neural network, etc.) of the asset (e.g., a turbine engine, diesel engine, other electromechanical device, etc.), for example. Asset health can be modeled while the asset is still fielded (e.g., the engine is still on-wing, etc.), for example. In addition to modeling current asset health, a future health or life expectancy for the asset can be determined by the model and/or other analytics 520. The health analytics 520 generate an asset health state 540 (e.g., a health level and/or life expectancy, etc.) for the target asset, which is provided to the workscope task generator 505. For example, the current health level of the target asset affects whether or not the asset can continue to function and impacts a scope of repairs and/or other maintenance to place the target asset in proper working order. The asset health state 540 can be used to model and/or otherwise impact tasks to be done in the workscope for the target asset.

In certain examples, the asset health state 540 can be reflected in a physics-based model, such as a digital twin, etc., of the target asset (e.g., a turbine engine, diesel engine, wind turbine, etc.). The model can be associated with the asset health state 540 which can then be compared with and/or otherwise exposed to various health and non-health related factors, expectations, requirements, etc., to evaluate a behavior of the model and its asset health state 540, for example. Using the model, interactions, simulations, and/or other evaluation can occur with multiple external factors in multiple scenarios done via a computing device. Such modeling and evaluation is not achievable manually or in the human mind.

At block 1004, non-health information related to the target asset is processed. For example, input not directly related to current target asset health such as LLP information, SB information, repair specifications, etc., can be factored into an analysis of tasks for the target asset. For example, a part of the asset can be a life limited part (LLP) with replacement on the horizon. A service bulletin (SB) may mandate an upgrade or repair to a target asset module, for example. Repair specifications may control one or more tasks for the target asset's next shop visit, for example.

In the physics-based model example described above, one or more non-health items can be constructed as characteristics, factors, inputs, and/or other constraints to the digital twin of the target asset (and/or sub-system of the target asset, etc.). An effect of the non-health item(s) (e.g., LLP restrictions, SB requirements, repair specifications, etc.) can be modeled on the virtual construct of the target asset (e.g., the digital twin of the engine, etc.). An effect of the non-health information on the asset health state 540 of the target asset can be modeled and evaluated, for example. Thus, an impact of non-health factors on a target health level of the asset can be evaluated by the system, where such an impact could not be effectively evaluated manually by humans or in the human mind. Accordingly, asset care, maintenance, durability, operability, and performance are improved through the improvement in multi-factor asset health and maintenance monitoring, evaluation, and task generation, for example.

At block 1006, next mission information is processed with respect to the target asset. For example, requirements specified for a next mission involving the asset (e.g., a next flight involving the engine, etc.) are processed to be used to evaluate the tasks generated for the target asset. By modeling and/or otherwise quantifying the mission requirements, a workscope for the target asset can be evaluated to help ensure the maintenance of the asset will allow the asset to meet the next mission requirements. If not, the tasks generated for the workscope can be adjusted to fit the mission requirements, for example.

To continue the physics-based model example, next mission requirements can be an additional constraint placed on the digital twin model for comparison of requirements and/or other expectations. Thus, a level of performance involved in the next mission for the target asset can be modeled (e.g., simulated using the digital twin, etc.) with the virtual construct of the target asset, as modified by associated health and non-health factors, to determine whether the target asset can complete the next mission. If not, maintenance tasks can be generated to bring the target asset to a health level sufficient to satisfy the next mission requirements.

At block 1008, tasks for maintenance of the target asset are generated by the workscope task generator 505 using a workscope transfer function (e.g., defined by Equation 2, etc.) applied to the health, non-health, and mission information. For example, given the target asset health level, non-health constraints, and next mission requirements, the workscope task generator 505 applies a workscope transfer function and evaluates whether the health level of the target asset will enable the target asset to function at a certain level for the next mission. If not, then the workscope task generator 505 determines a workscope of tasks to repair, replace, and/or otherwise maintain the asset for the next mission (e.g., to raise a health level of the target asset to a level of capability, durability, operability, performance, etc., sufficient for the next mission and/or another subsequent mission, etc.). Such a determination can also be impacted by non-health requirements such as repair specification requirements (e.g., as dictated by a service bulletin, life-limited part, etc.), environmental factors, contractual obligations, etc.

At block 1010, the next mission specific targeted tasks are processed by the workscope task processor 510 to generate a targeted workscope forecast of tasks for the target asset. For example, the set of tasks can be evaluated with respect to a lifecycle expectation (e.g., a number of cycles such as 3000 cycles, 10,000 cycles, 50,000 cycles, etc.). The lifecycle expectation can be evaluated against the planned, targeted maintenance tasks to help ensure that the targeted maintenance tasks will help the target asset to reach its lifecycle expectation.

In certain examples, if the next mission specific targeted tasks predict that the target asset will meet the lifecycle expectation, then the set of tasks can remain unchanged, for example. However, if the next mission specific targeted tasks predict that the target asset will not meet the lifecycle expectation, then the set of tasks can be adjusted to satisfy that the target asset will meet the lifecycle expectation. In some examples, if the next mission specific targeted tasks predict that the target asset will exceed the lifecycle expectation, then the set of tasks can be re-evaluated to perhaps adjust the set of tasks to satisfy that the target asset will meet, but not unduly exceed, the lifecycle expectation.

Alternatively or in addition, historical data (e.g., results of prior workscope task execution, target asset history, similar asset history, prior mission execution history, etc.) can be analyzed with respect to the next mission expectation, the target asset health, etc., to evaluate whether the next mission specific targeted tasks will allow the target asset to be in a certain health state to complete the next mission. In certain examples, if the historical data predicts that the next mission specific targeted tasks will allow the target asset to complete the next mission, then the set of tasks can remain unchanged, for example. However, if the historical data predicts that the next mission specific targeted tasks will not allow the target asset to complete the next mission, then the set of tasks can be adjusted to satisfy that the target asset will meet the lifecycle expectation. In some examples, if the historical data predicts that the next mission specific targeted tasks will be more than sufficient to allow the target asset to complete the next mission, then the set of tasks can be re-evaluated to perhaps adjust the set of tasks to satisfy that the target asset will meet, but not unduly exceed, the next mission requirements.

At block 1012, forecasted, targeted workscope tasks are generated for the target asset. For example, based on the health state, target asset characteristics, non-health constraints, next mission requirements, lifecycle expectation, and/or historical data, workscope tasks targeted to bring the target asset to a forecast health level to complete the next mission in satisfaction of the non-health requirements is generated for the target asset. The set of workscope tasks can trigger maintenance of the target asset (e.g., engine, turbine, etc.) at a shop visit, for example. The set of workscope tasks can be implemented in a schedule for removal, transport, maintenance, and reinstallation of the target asset, for example. The set of forecast, targeted workscope tasks can be provided for optimization by the task optimizer 310, for example.

Figure 11:
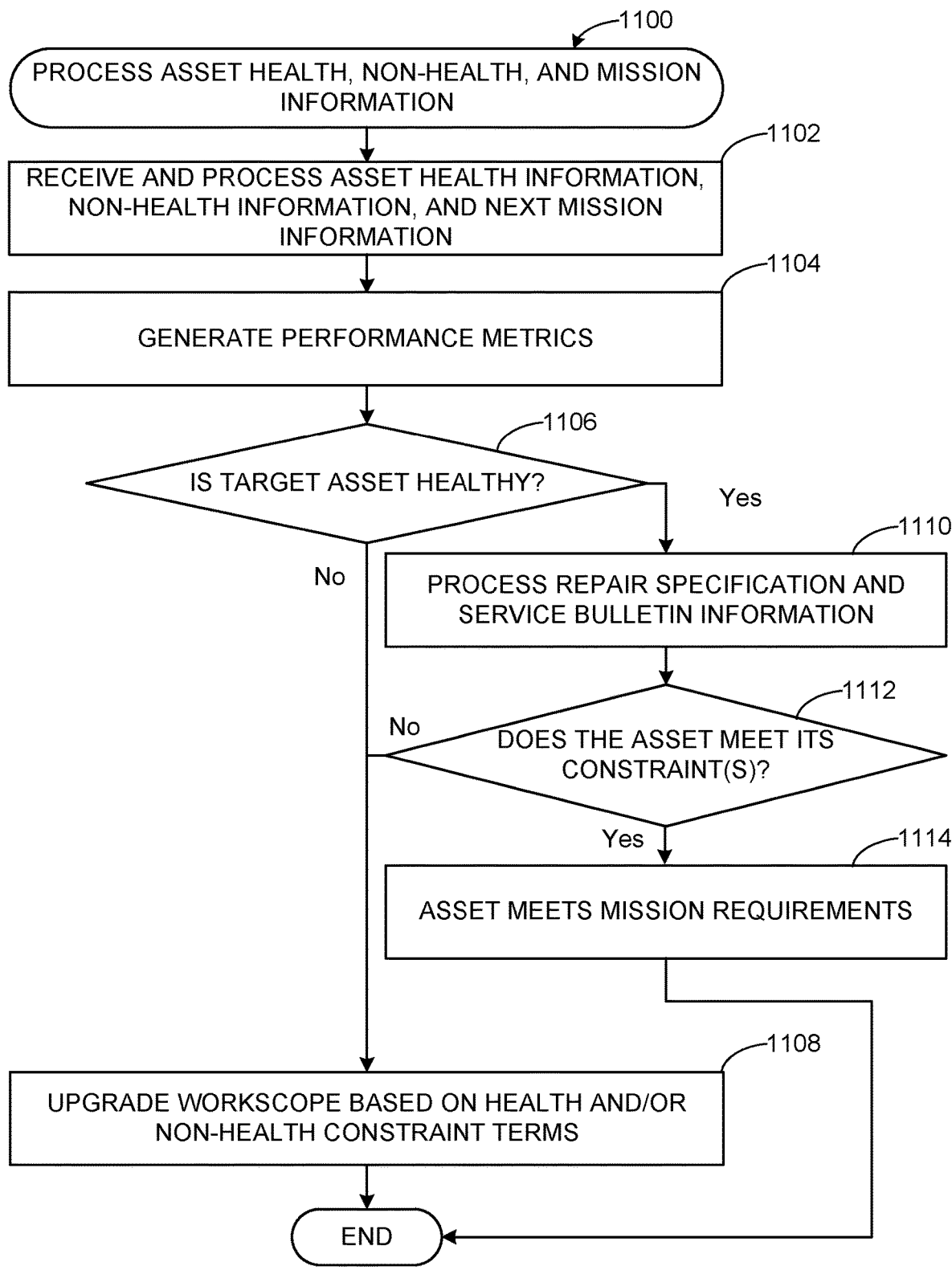

FIG. 11 is a flowchart representative of an example method 1100 to process asset health, non-health, and mission information (e.g., executing blocks 1002-1008 of the example of FIG. 10, etc.). At block 1102, asset health information, non-health information, and next mission information are received and processed (e.g., by the workscope task generator 505). For example, a representation (e.g., model, equation, etc.) of current asset health state and non-health constraint(s) related to the asset (e.g., contract requirement, life limited part restriction, SB information, environmental constraint, etc.) are processed to model asset health, non-health constraints, mission requirements, and/or the target asset. For example, the target asset (e.g., an engine, turbine, scanner, etc.) can be modeled in a virtual environment as a physics-based digital twin model of the physical target asset in a real environment.

At block 1104, one or more performance metrics can be generated based on the asset health, non-health, and next mission information. For example, an asset durability (e.g., cumulative damage model (CDM), distress rank model (DRM), etc.), operability, LLP information, configuration/utilization information, removal cause, mission data, and/or other performance analytic can be generated.

At block 1106, the target asset health state is evaluated with respect to the performance metrics, next mission requirement, etc., to determine whether or not the target asset is healthy. If the target asset is not healthy, then, at block 1108, workscope tasks are updated based on health and/or non-health constraint terms.

However, if the target asset is deemed healthy, then, at block 1110, then information such as a repair specification, SB information, etc., is processed and evaluated to determine, at block 1112, whether the target asset is meeting its constraint(s), such as repair requirements, SB restrictions, LLP limits, and/or other contract constraints required and/or agreed upon with respect to the target asset, for example. If the target asset is meeting its constraints, then, at block 1114, the target asset is determined to meet its mission requirements (e.g., sufficient health including performance, operability, durability, etc., for a next flight, a next energy generation, a next image acquisition, etc.). However, if the target asset is not meeting its constraints, then, at block 1108, workscope tasks are updated based on health and/or non-health constraint terms.

Figure 12:
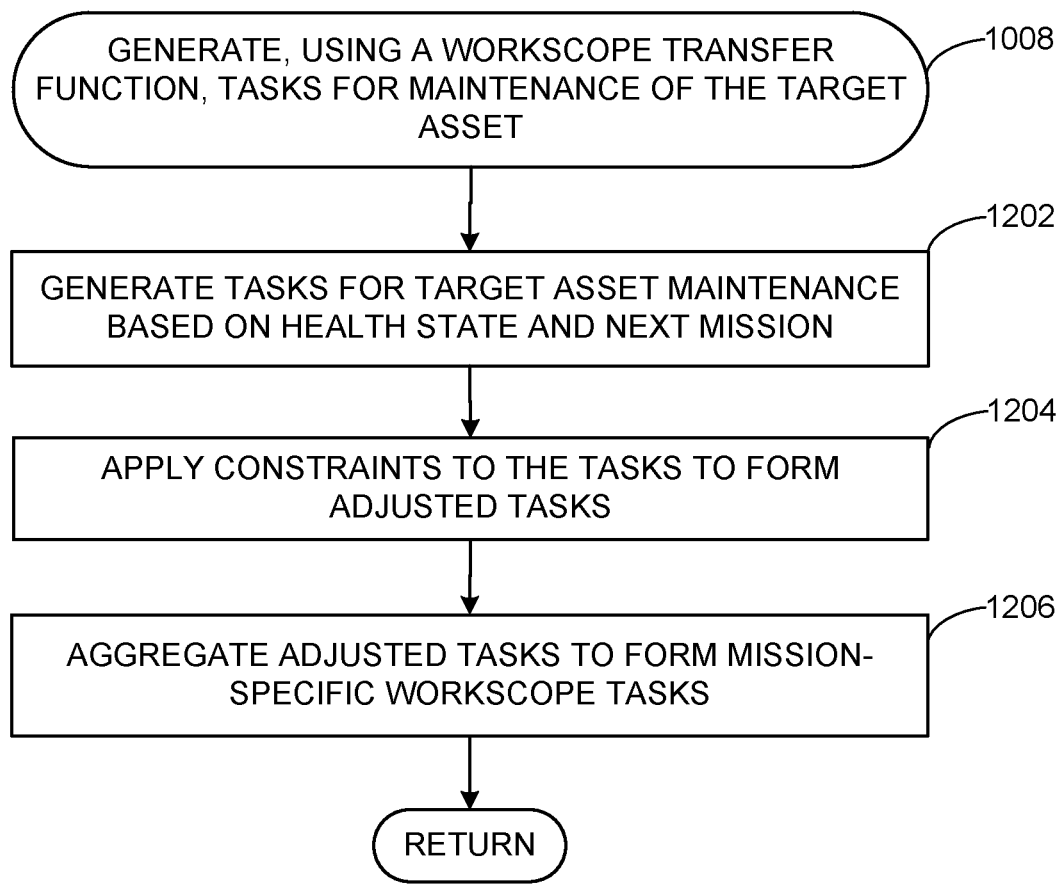

FIG. 12 is a flowchart representative of an example method to generate, using a workscope transfer function (e.g., defined by Equation 2, etc.), tasks for maintenance of the target asset (e.g., block 1008 of FIG. 10). At block 1202, available information including target asset health status, next mission requirements, etc., is combined to generate tasks for maintenance of the target asset at a desired health state for the next mission. For example, given the target asset health level, non-health constraints, and next mission requirements, the workscope task generator 505 applies a workscope transfer function (e.g., as defined by Equation 2, etc.) and evaluates whether the health level of the target asset will enable the target asset to function at a certain level for the next mission. If not, then the workscope task generator 505 determines a workscope of tasks to repair, replace, and/or otherwise maintain the asset for the next mission (e.g., to raise a health level of the target asset to a level of capability, durability, operability, performance, etc., sufficient for the next mission and/or another subsequent mission, etc.).

At block 1204, constraints are applied to the tasks to form adjusted tasks. For example, the constraint analyzer 820 of the workscope task generator 505 applies non-health requirements such as repair specification requirements (e.g., as dictated by a service bulletin, life-limited part, etc.), environmental factors, contractual obligations, LLP restrictions, and/or other constraints, etc., modify tasks expected be performed with respect to maintenance of the target asset such that the target asset is ready and able to perform its next mission in satisfaction of the next mission requirements. For example, a service bulletin and/or life-limited part restriction may mandate that a component of the target asset be replaced, regardless of whether or not that component is to be used and/or is of insufficient health for use in the next mission. A contractual agreement may mandate part replacement at a certain part, regardless of its impact on the next mission requirements, for example.

At block 1206, adjusted tasks are aggregated to form mission-specific workscope tasks. For example, the task aggregator 825 of the workscope task generator 505 gathers tasks impacted and/or otherwise processed, expanded, added, reduced, altered, etc., according to the one or more constraints from the constraint analyzer 820 and forms a set of mission-specific workscope tasks 545. Thus, the various constraint(s) and associated tasks can be aggregated into a cohesive set of mission-specific workscope tasks 545 to prepare the target asset to execute the next mission, for example. Control then reverts to block 1010 to modify the tasks if a lifecycle expectation and/or historical data is present and applicable.

Figure 13:
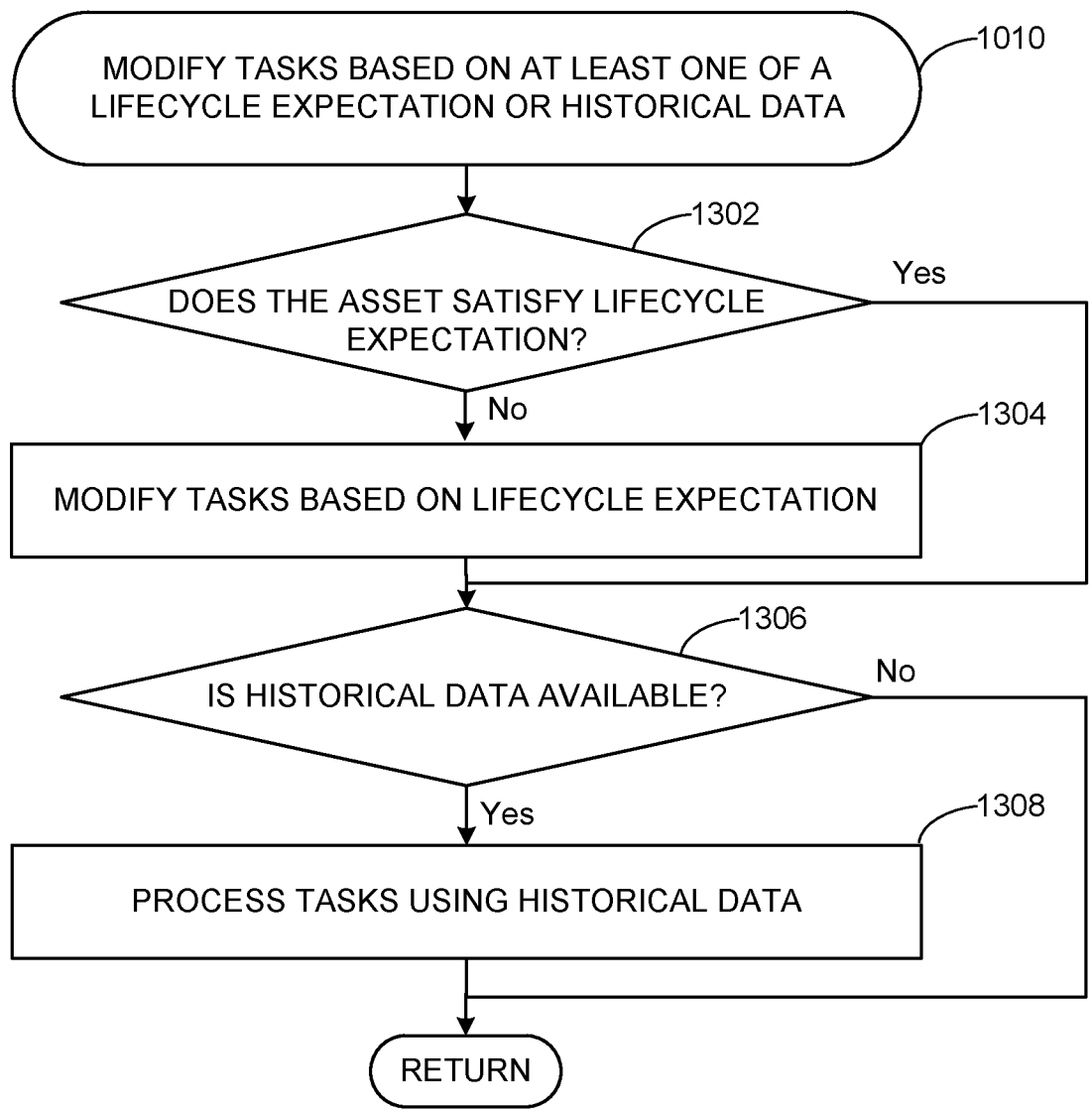

FIG. 13 is a flowchart representative of an example method to modify tasks based on at least one of a lifecycle expectation or historical data (e.g., block 1010 of FIG. 10). At block 1302, when a lifecycle expectation is available, the tasks and associated target asset health state are evaluated to determine whether the target asset satisfies a lifecycle expectation (e.g., a certain number of operating cycles for the target asset and/or an asset module/part/component/etc. before an end of contract, end of asset life, etc.). If the target asset, as maintained by the set of tasks, does not satisfy the lifecycle expectation, then, at block 1304, the set of workscope tasks is modified to help ensure that the target asset will satisfy the lifecycle expectation. Thus, for example, additional maintenance can be performed on the target asset, beyond requirements for the next mission, to help ensure that the lifecycle expectation will be met by the target asset. In some examples, maintenance can be reduced (e.g., repair instead of replace, used instead of new, repair postponed, etc.) if the tasks are likely to exceed the lifecycle expectation for the target asset, as long as the reduction does not result in a predicted failure of the target asset for the next mission.

At block 1306, availability of historical data (e.g., prior mission feedback, target asset feedback, other similar asset information, etc.) is determined. If relevant historical data is available, then, at block 1308, the set of maintenance workscope tasks is processed based on the historical data. For example, tasks can be modified based on past target asset experience, feedback from other execution of the next mission, insight into similar asset health state, performance, etc.). Control then reverts to block 1012 to generate forecasted, targeted workscope tasks for the target asset.

Figure 14:
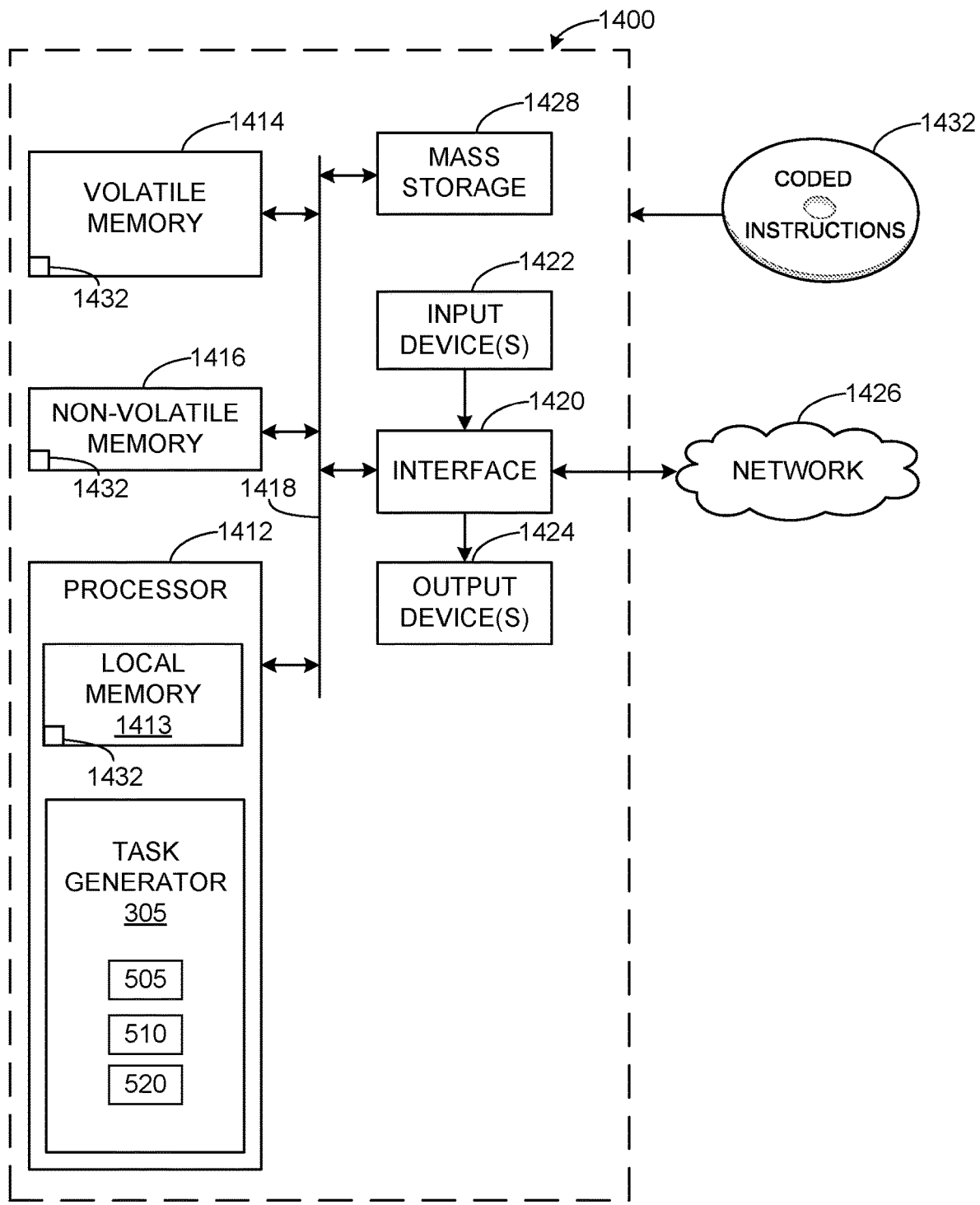
FIG. 14 is a block diagram of an example processing platform structured to execute machine-readable instructions to implement the methods of FIGS. 10-13 and/or the example asset workscope generation system of FIGS. 2-9.

FIG. 14 is a block diagram of an example processor platform 1400 capable of executing the instructions of FIGS. 10-13 to implement the task optimizer 310 and/or the AWGS 220 of FIGS. 2-9. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The hardware processor may be a semiconductor based (e.g., silicon based) device. In this example, the processor 1412 implements the example workscope task generator 505, the example workscope task processor 510, and the example health analytics 520.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a peripheral component interconnect (PCI) express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and DVD drives.

The coded instructions 1432 of FIGS. 10-13 can be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that evaluate asset health state and next mission requirements to generate tasks for maintenance of a target asset to help ensure the target asset (e.g., a turbine engine, diesel engine, other engine, wind turbine, imaging system, etc.) will satisfy the next mission requirements as further constrained by non-health information such as contractual obligations, service bulletins, life limited part restrictions, environmental constraints, etc. The above-disclosed task generator apparatus can optimize and/or otherwise improve generation and selection of appropriate workscope tasks based on a plurality of factors including expected cost, operating margin over the life of an associated contract, time in shop, time before next failure, lifecycle expectation, historical data/feedback, etc. The task generator apparatus performs a tradeoff analysis based on these factors, and facilitates maintenance of the target asset (e.g., removal of the asset, shop visit for repair/replacement, temporary asset substitution while in shop, etc.). Certain examples leverage constraint information, feedback, and end of life expectations to balance tasks to maintain the target asset at a certain durability, operational, and/or performance level. Workscope determination is automated and customized to the target asset, next mission, and applicable constraint(s), for example. Both deterministic and probabilistic events are evaluated to provide a more complete picture or model of the asset and its operating environment.

When faced with millions of possibilities, the task generator determines a subset of available tasks more likely to allow the target asset to achieve the next mission within its constraints. The health analytics, workscope task generator, and task processor model the target asset, associated health state, next mission requirements, constraints, expectations, feedback, etc., to predict which tasks provide the desired benefit of task asset operability, durability, performance, etc. Determined tasks can then trigger, initiate, and/or otherwise facilitate maintenance of the target asset.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An engine maintenance apparatus comprising:
  a workscope task generator to process, for an engine, an asset health quantifier for the engine and a next mission criterion for the engine according to a workscope transfer function to generate a set of workscope tasks for maintenance of the engine at a health state to satisfy the next mission criterion, the workscope tasks involving a location, a resource, and a time for maintenance of the engine and comprising asset health analytics to process the asset health quantifier using a health state transfer function to generate an asset health state from the asset health quantifier;
  a workscope task processor to process the generated set of workscope tasks in comparison to a lifecycle expectation for the engine,
  wherein, when the generated set of workscope tasks does not satisfy the lifecycle expectation for the engine, the set of workscope tasks is modified by the workscope task processor, the workscope task processor to generate a set of targeted, forecast workscope tasks from the modified set of workscope tasks to trigger maintenance of the engine.

2. The apparatus of claim 1, wherein, when historical data is available to the workscope task processor, the workscope task processor is to modify the set of workscope tasks based on the historical data to generate the set of targeted, forecast workscope tasks for the engine.

3. The apparatus of claim 1, wherein the workscope transfer function further processes a non-health constraint applicable to the engine, the non-health constraint to be applied by the workscope task generator with respect to the health state and the next mission criterion to impact the generation of the set of workscope tasks.

4. The apparatus of claim 1, wherein the workscope transfer function models the engine using a physics-based model and associates the asset health quantifier with the physics-based model to simulate whether an asset health state of the engine satisfies the next mission criterion.

5. The apparatus of claim 1, wherein at least one of the asset health quantifier, next mission criterion, or lifecycle expectation is to be weighted according to a criticality index.

6. The apparatus of claim 5, wherein the asset health state includes an indication of durability, operability, and performance of the engine.

7. A non-transitory computer readable storage medium comprising instructions which when executed, cause a machine to implement at least:
  a workscope task generator to process, for an engine, an asset health quantifier for the engine and a next mission criterion for the engine according to a workscope transfer function to generate a set of workscope tasks for maintenance of the engine at a health state to satisfy the next mission criterion, the workscope tasks involving a location, a resource, and a time for maintenance of the engine and comprising asset health analytics to process the asset health quantifier using a health state transfer function to generate an asset health state from the asset health quantifier; and
  a workscope task processor to process the generated set of workscope tasks in comparison to a lifecycle expectation for the engine, wherein, when the generated set of workscope tasks does not satisfy the lifecycle expectation for the engine, the set of workscope tasks is modified by the workscope task processor, the workscope task processor to generate a set of targeted, forecast workscope tasks from the modified set of workscope tasks to trigger maintenance of the engine.

8. The non-transitory computer readable storage medium of claim 7, wherein, when historical data is available to the workscope task processor, the workscope task processor is to modify the set of workscope tasks based on the historical data to generate the set of targeted, forecast workscope tasks for the target asset.

9. The non-transitory computer readable storage medium of claim 7, wherein the workscope transfer function further processes a non-health constraint applicable to the target asset, the non-health constraint to be applied by the workscope task generator with respect to the health state and the next mission criterion to impact the generation of the set of workscope tasks.

10. The non-transitory computer readable storage medium of claim 7, wherein at least one of the asset health quantifier, next mission criterion, a non-health obligation, or lifecycle expectation is to be weighted according to a criticality index.

11. The non-transitory computer readable storage medium of claim 10, wherein the asset health state includes an indication of durability, operability, and performance of the target asset.

12. A computer-implemented method comprising:

processing, using a configured processor, health information, non-health information, and next mission requirements for a target asset to generate one or more performance metrics and processing an asset health quantifier included in the health information using a health state transfer function to generate an asset health state from the asset health quantifier;

generating, using the configured processor and a workscope transfer function with the one or more performance metrics, one or more tasks for maintenance of the target asset; when the generated tasks do not satisfy the lifecycle expectation for the target asset, modifying, using the configured processor, the one or more tasks based on the lifecycle expectation;

generating and outputting, using the configured processor based on the one or more tasks, a set of targeted, forecast workscope tasks to trigger maintenance of the target asset.

13. The computer-implemented method of claim 12, wherein, when historical data is available, modifying the one or more tasks based on the historical data.

14. The computer-implemented method of claim 12, wherein the workscope transfer function further processes a non-health constraint applicable to the target asset, the non-health constraint to be applied with respect to the health state and the next mission criterion to impact the generation of the one or more tasks for maintenance of the target asset.

15. The computer-implemented method of claim 12, wherein at least one of the asset health quantifier, next mission criterion, a non-health obligation, or lifecycle expectation is to be weighted according to a criticality index.

16. The computer-implemented method of claim 12, wherein the asset health state includes an indication of durability, operability, and performance of the target asset.

17. The computer-implemented method of claim 12, wherein processing, using a configured processor, health information, non-health information, and next mission requirements for the target asset includes evaluating whether the target asset is healthy and whether the target asset satisfies a contract associated with the target asset.

18. The computer-implemented method of claim 12, wherein the target asset includes an engine.

* * * * *